(12) United States Patent
Kreisel et al.

(10) Patent No.: US 9,449,640 B2
(45) Date of Patent: Sep. 20, 2016

(54) MEDIA DEVICE TURNTABLE

(71) Applicants: Glenn Kreisel, Missoula, MT (US); Benjamin Bloch, Cameron, MT (US)

(72) Inventors: Glenn Kreisel, Missoula, MT (US); Benjamin Bloch, Cameron, MT (US)

(*) Notice: Subject to any disclaimer, the term of this patent is extended or adjusted under 35 U.S.C. 154(b) by 0 days.

(21) Appl. No.: 14/294,402

(22) Filed: Jun. 3, 2014

(65) Prior Publication Data

US 2015/0348581 A1 Dec. 3, 2015

(51) Int. Cl.
*G09G 5/00* (2006.01)
*G11B 19/02* (2006.01)

(52) U.S. Cl.
CPC ..................... *G11B 19/02* (2013.01)

(58) Field of Classification Search
CPC ........... G10H 1/00; G10H 1/36; H04M 1/02; H04M 17/10; G11B 19/02
USPC ......................................................... 345/156
See application file for complete search history.

(56) References Cited

U.S. PATENT DOCUMENTS

| | | | | |
|---|---|---|---|---|
| 6,956,564 B1* | 10/2005 | Williams | ............ | G06F 3/03545 178/18.01 |
| 2002/0135163 A1* | 9/2002 | Derrick | ................ | B60Q 1/1484 280/731 |
| 2008/0306619 A1* | 12/2008 | Cerra | ..................... | G11B 27/10 700/94 |
| 2011/0276333 A1* | 11/2011 | Wang | ................ | G06F 17/30861 704/270 |
| 2012/0221741 A1* | 8/2012 | Frojdh | ........... | H04N 21/234318 709/231 |
| 2012/0310588 A1* | 12/2012 | Lee | ........................ | G06F 1/1694 702/141 |

OTHER PUBLICATIONS

Bryan et al. ("Two Turntables and a Mobile Phone" NIME'11, May 30-Jun. 1, 2011, Oslo, Norway; retrieved from https://ccrma.stanford.edu/~njb/research/turntable/NIME2011-turntable.pdf on Jun. 20, 2015).*
Harihar (Shake Torch Flash LED light 1.5 Android app page, accessed on Jun. 18, 2015 at http://shake-torch-flash-led-light.android.informer.com/1.5/, app published Feb. 1, 2014).*
Bryan et al. ("Two Turntables and a Mobile Phone" NIME'I 1, May 30- Jun. 1, 2011, Oslo, Norway; retrieved from https://ccrma.stanford.edu/~njb/research/turntable/NIME2011-turntable.pdf on Jun. 20, 2015).*
Cirrus Logic, "Ultralow Power Mobile Audio and Telephony CODEC" (CS42L73), Jul. 2013 (139 pages).
Bosch, BMA220, Digital, triaxial acceleration sensor, Data Sheet, Aug. 2011 (54 pages).
STMicroelectronics, LIS331DLH, MEMS digital output motion sensor, 2009 (38 pages).
OXO, 11' Turntable, 2013 (4 pages).
Apple, Case Design Guidelines for Apple Devices, Release R6, 2013 (65 pages).

\* cited by examiner

*Primary Examiner* — Kent Chang
*Assistant Examiner* — Mark Edwards
(74) *Attorney, Agent, or Firm* — Brian J. Pangrle

(57) ABSTRACT

An assembly can include a base; and a turntable rotatably coupled to the base where the turntable can include an optical port, a mount that positions an electronic device with respect to the optical port and at least one waveguide operatively coupled to the optical port.

10 Claims, 20 Drawing Sheets

MEDIA DEVICE TURNTABLE

TECHNICAL FIELD

Subject matter disclosed herein generally relates to media devices and associated equipment and techniques.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

Turntables find use in various fields. For example, consider a media player such as a record player where a disc embodied with information rotates with respect to a media reader head. In such an example, circuitry may render the information, for example, as audio via one or more speakers. Various equipment, technologies, techniques, etc., are described herein that pertain to media players (e.g., media controllers, etc.) and associated equipment and techniques that can include turntables, etc.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing general principles of the implementations. The scope of the described implementations should be ascertained with reference to the issued claims.

Various subject matter described herein includes one or more examples of new, original, and ornamental designs (e.g., for an article of manufacture). For example, subject matter described herein includes one or more of: (A) a design for an ornament, impression, print, or picture applied to or embodied in an article of manufacture (surface indicia); (B) a design for the shape or configuration of an article of manufacture; or (C) a combination of the first two categories.

We, Glenn Kreisel and Benjamin Bloch, being citizens of the United States, have invented new, original, and ornamental designs for turntables and for computer icon images that can be displayed as designs for an article of manufacture that can be a computer screen, a display panel or a monitor.

Turntablism has been described as the art of manipulating sounds and creating music using direct-drive turntables and a DJ mixer. The term turntablist has been used to describe the difference between a DJ who just plays records and one who performs by touching and moving the records, stylus and mixer to manipulate sound. A "hiphop/scratch" artist may play a record like an electronic washboard with a phonographic needle as a plectrum to produce sounds that may be unique (e.g., difficult to reproduce). To such an artist, the record player may be considered to be a musical instrument. Some turntablist DJs use turntable techniques like beat mixing/matching, scratching and beat juggling. Some turntablists seek to have themselves recognized as traditional musicians capable of interacting and improvising with other performers.

Figure 1:
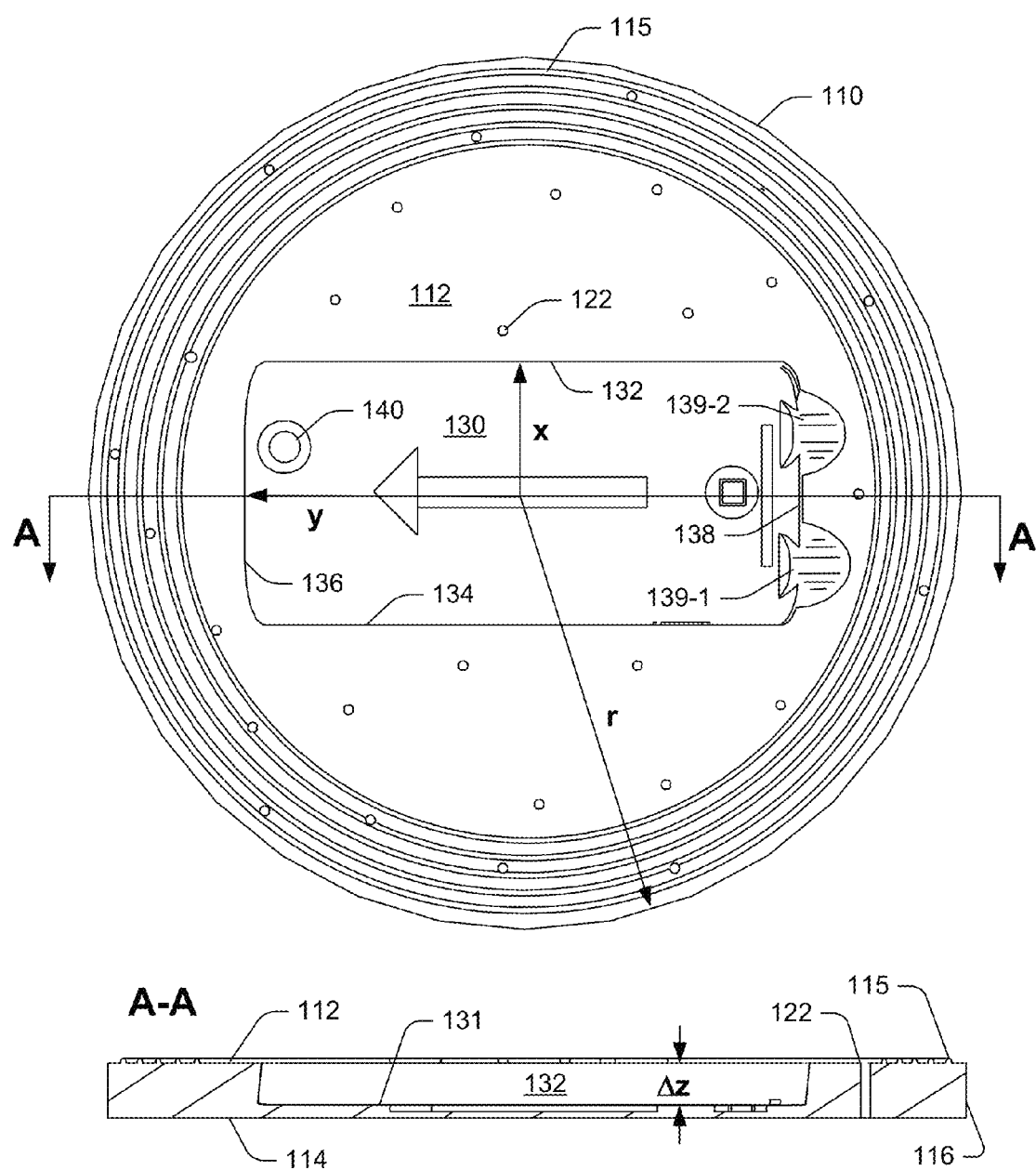
FIG. 1 illustrates views of an example of a turntable.

FIG. 1 shows a plan view and a cross-sectional view along a line A-A of an example of a turntable 110 that includes an upper surface 112, a lower surface 114, surface indicia 115, a peripheral surface 116, optical passages 122 and a recess 130 that includes an optical port 140.

In the example of FIG. 1, the recess 130 includes a floor 131, lateral walls 132 and 134, end walls 136 and 138 and supplemental recesses 139-1 and 139-2. In FIG. 1, the recess 130 may be shaped with various dimensions to seat an electronic device. For example, the recess 130 may include dimensions in a Cartesian coordinate system (x, y and z) that can seat an electronic device such as a cellular phone.

As an example, a cellular phone may be seated in the recess 130 of the turntable 110 to align a lens of a flash unit of the cellular phone with the optical port 140 and to align one or more speakers of the cellular phone with the supplemental recesses 139-1 and 139-2. In such an example, one or more of the supplemental recesses 139-1 and 139-2 may provide finger or other tool access, for example, for removal of a cellular phone from the recess 130.

In the example of FIG. 1, one or more features of the turntable 110 may be described with respect to a cylindrical coordinate system (r, z, Θ). For example, the surface indicia 115 may be a series of concentric ridges disposed at various radii. Such surface indicia may provide for traction, for example, where sweat, moisture, etc. may flow to spaces between the ridges while leaving upper ridge surfaces more suitable for finger-based movements.

As an example, the turntable 110 may be made of a material such as metal, alloy, plastic, etc. For example, the turntable 110 may be made of a polymeric material, optionally with a surface finish that is rough to provide an increase friction coefficient with respect to a surface of a hand.

In the example of FIG. 1, the turntable 110, or one or more components coupled thereto, may act as waveguides. For example, a waveguide or waveguides may guide electromagnetic energy emissions from a flash unit of a device seated in the recess 130 to one or more of a plurality of the passages 122. For example, a sub-assembly that includes fiber optics may guide light from the optical port 140 to the passages 122.

As an example, where a device is seated in the recess 130 of the turntable 110, the device may include motion sensing circuitry. For example, consider an accelerometer, a gyroscope, etc. As an example, rotation of the turntable 110 about a central axis may cause a motion sensing circuitry of a device to sense motion and to control one or more outputs. For example, where the device includes a flash, motion sensing circuitry may be operatively coupled to flash driver circuitry to trigger the flash based at least in part on the sensed motion. As another example, where the device includes media player circuitry, motion sensing circuitry may be operatively coupled to the media player circuitry for controlling the media player circuitry. For example, the media player circuitry may be controlled in a manner akin to a system used by a turntablist. In such an example, the device may provide for beat mixing/matching, scratching and beat juggling. As an example, the device in combination with the turntable may be a musical instrument.

As an example, an assembly can include a base; and a turntable (see, e.g., the turntable 110) rotatably coupled to the base where the turntable includes an optical port (see, e.g., the optical port 140), a mount (see, e.g., the recess 130) that positions an electronic device with respect to the optical port and at least one waveguide operatively coupled to the optical port. In such an example, the mount may be or include a rectangular recess where, for example, the optical port is disposed in a floor of the rectangular recess.

Figure 2:
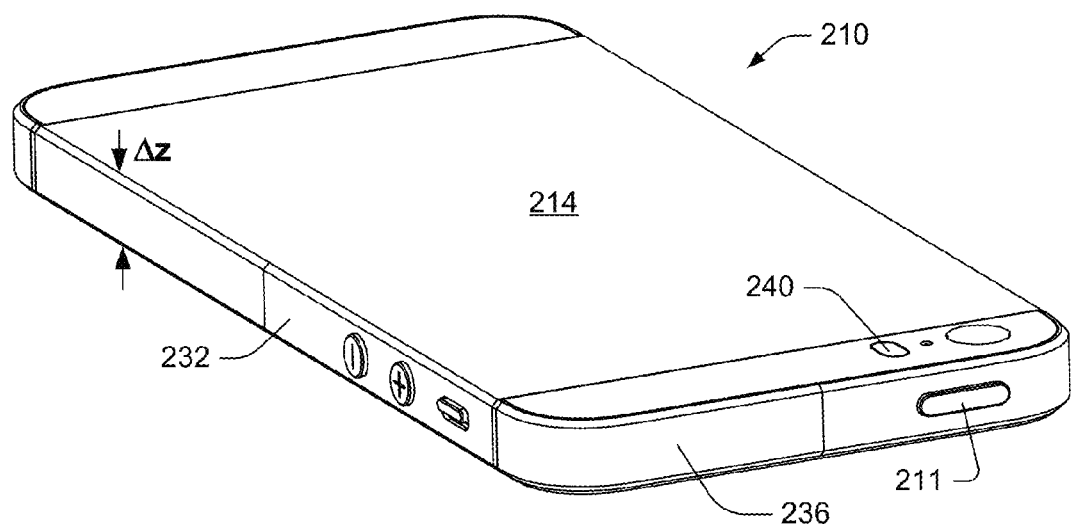
FIG. 2 illustrates views of an example of a device.
Figure 2:
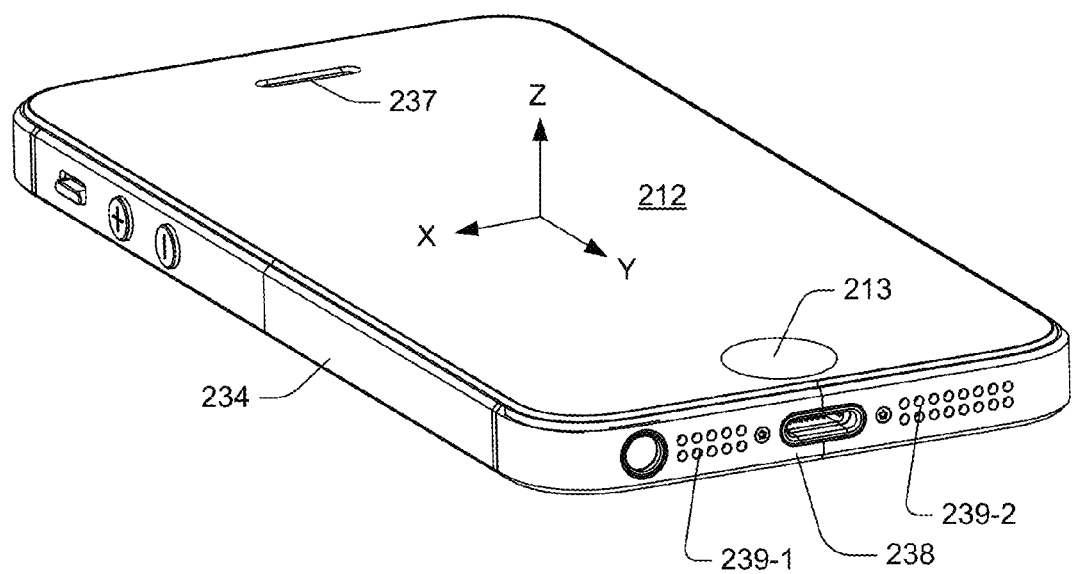

FIG. 2 shows two perspective views of an example of a cellular phone 210 that may be seated in the recess 130 of the turntable 110 of FIG. 1. As shown, the cellular phone 210 includes an activation switch 211, an upper surface 212, another activation switch 213, a lower surface 214, side surfaces 232 and 234 and end surfaces 236 and 238. As shown, the cellular phone 210 also includes one or more speaker ports 237, 239-1 and 239-2 as well as a flash unit port 240 (e.g., a lens, etc.). As an example, the cellular phone 210 may be seated in the recess 130 of the turntable 110 to align the flash unit port 240 with the optical port 140 and, for example, to align the speaker ports 239-1 and 239-2 with the supplemental recesses 139-1 and 139-2. In the example of FIG. 2, the cellular phone 210 also includes a jack that may be a physical jack for output of audio signals; noting that wireless circuitry may be included for wireless output of audio information.

As an example, the cellular phone 210 of FIG. 2 may be described with respect to a coordinate system such as a Cartesian coordinate system (e.g., with x, y, z coordinates). As an example, an electronic device may include an axis that may be considered a central axis. Such an axis may be normal to a plane defined by the device, for example, defined by a display of the device. As an example, when carried by a turntable, the turntable may rotate about a rotational axis that may be aligned with the central axis of the device. As an example, a central axis may be a geometrically "centered" axis. As an example, a mass centered axis may be defined. As an example, a mass center may be at or near a geometric center. As an example, motion sensing circuitry may be at or offset from a geometric center (see, e.g., FIG. 13). As an example, a device may be carried by a turntable and rotated where such rotation may correspond to a rotational axis that may be at a geometric center of the device or offset from a geometric center of the device. As described herein, a "plane" is a geometrical plane (e.g., not an abbreviation for an airplane). For example, the cellular phone 210 may be substantially planar and may be rotated within a geometrical plane.

Figure 3:
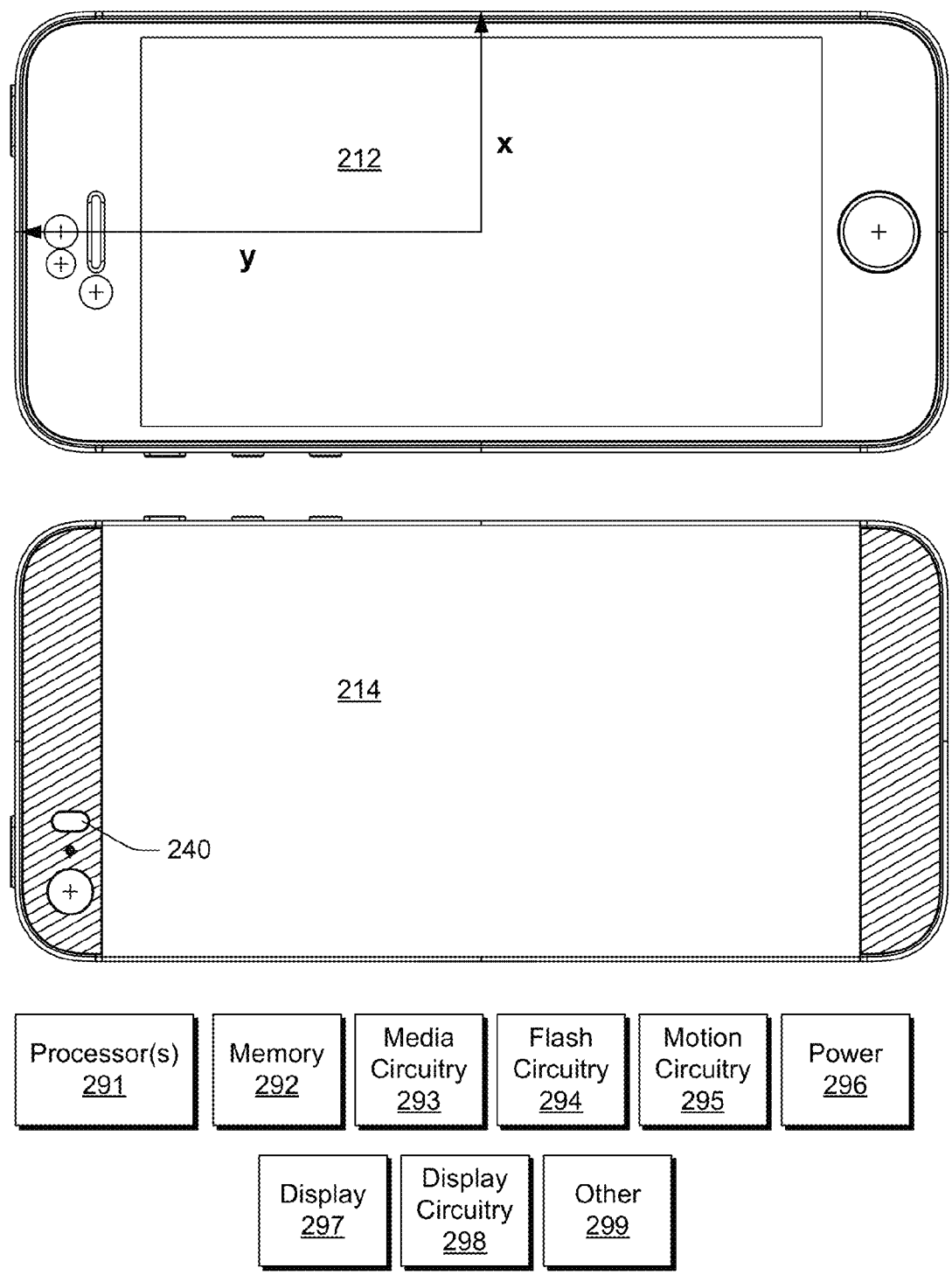
FIG. 3 illustrates views of the device FIG. 2.

FIG. 3 shows additional views of the cellular phone 210 of FIG. 2. As an example, the cellular phone 210 may be an iPhone™ cellular phone of Apple Corporation, Cupertino, Calif. (e.g., consider an iPhone 5 or other iPhone cellular phone or "smart phone"). As an example, a turntable may be configured with a recess to seat a particular electronic device, which may optionally be a cellular phone. As an example, a turntable may be configured to seat a media player device that includes motion sensing circuitry.

FIG. 3 shows various examples of components that may be included in an electronic device such as the device 210. For example, an electronic device may include one or more processors 291, memory 292, media circuitry 293, flash circuitry 294, motion circuitry 295 (e.g., motion sensing circuitry), power 296 (e.g., power circuitry, a battery, etc.), a display 297, display circuitry 298 and other circuitry or components 299. As an example, circuitry may include one or more of hardware, software, firmware, etc.

As an example, a device may include an operating system that can establish an operating system environment that is suitable for execution of applications (e.g., instructions stored in memory, etc.). As an example, a device may include one or more application programming interfaces (APIs). As an example, a call may be made to an API where the call may include one or more parameters. Such a call may instruct a device to perform an action and optionally return information. For example, an application may receive information (e.g., via circuitry, user input, etc.) and formulate an API call that calls for a device to perform an action (e.g., render audio, render video, trigger a flash via flash circuitry, receive sensor data, set a parameter value, etc.). As an example, consider the iOS APIs that may operatively couple with one or more services.

As an example, consider core audio services that may be layered on top of a hardware abstraction layer (HAL). As an example, audio signals may pass to and from hardware through the HAL. An application may access the HAL using, for example, audio hardware services in a core audio framework. As another example, consider a Core MIDI (Musical Instrument Digital Interface) framework that can provide interfaces for MIDI data.

As another example, consider a core motion framework that can provide an application access to motion data from motion sensing circuitry. Such a framework may support access of raw and/or processed accelerometer data, for example, using block-based interfaces. As an example, consider a device with a gyroscope where a motion framework provides for retrieval of raw gyro data, processed data, etc. A motion framework may allow for accelerometer and/or gyro-based data one or more applications that can utilize motion as input. As a particular example, consider an instance of a CMAccelerometerData class that represents an accelerometer event, which may be a measurement of acceleration along multiple spatial axes at a moment of time (e.g., typedef struct {double x; double y; double z;} CMAcceleration). Various examples of resources for the iOS may be available, for example, via Apple Inc., Cupertino, Calif. (see, e.g., developer.apple.com/library/ios/).

As an example, an application executable on an electronic device may be coded in accordance to one or more software frameworks. As an example, code may conform to, for example, the Swift software framework (Apple Inc., Cupertino, Calif.), which is an object-oriented programming language that targets iOS and OS X. The Swift software framework includes getter/setter syntax akin to that of C#, the type after variable named and colon akin to Pascal-derived languages, string interpolation as in various scripting languages (e.g., using \(foo) versus Groovy's ${foo}), a question mark suffix after a type to denote it can be nullable akin to Ceylon, range operators akin to Ruby (e.g., noting that code for an application may be that of one or more software frameworks such as, for example, Swift, C, Groovy, Ceylon, Ruby, etc.). The Swift software framework may be utilized for direct access to the Foundation framework (e.g., base layer of objective-C classes) and the UIKit framework (e.g., classes to construct and manage an application's user interface).

As an example, a device may include one or more of audio codec circuitry, audio chip circuitry, etc. As an example, consider one or more components marketed by Cirrus Logic (e.g., Apple 33851077 Audio CODEC and Apple 33851117 Cirrus Audio Chip). As an example, an audio codec may include one or more stereo codecs and/or multichannel codecs (e.g., for surround sound applications). As an example, a component may include an analog to digital converter and/or a digital to analog converter.

As an example, a device can include a processor and memory accessible by the processor. As an example, a device can include a display and display driver circuitry for rendering information to the display. As an example, a device can include a touch-sensitive display operable via one or more touch-sensing techniques (e.g., capacitive finger touch, stylus touch, etc.). As an example, one or more computer-readable media may include processor-executable instructions that may be stored in memory and executable by a processor to cause a device to perform one or more actions. As an example, a computer-readable media may be a storage media that is non-transitory. As an example, various techniques, methods, etc. described herein may be implemented via a device that includes a processor and memory. As an example, a device may include circuitry that can receive media data and render media data. For example, a device may receive a song file as media data and include media player circuitry that can render the media data as electronic signals for receipt by a transducer such as a speaker.

As an example, a device may include rendering one or more graphical user interfaces (GUIs) to a display that may be a touch-sensitive display. As an example, a GUI may include one or more controls that may be actuated via touch or other input (e.g., voice command, motion gesture, etc.). As an example, a device may be seated in a turntable and operated to render a GUI where one or more controls may be selected via rotation of the turntable. For example, consider a GUI that illustrates options arranged about an arc. In such an example, at least a portion of the GUI may remain stationary while rotation causes a pointer (e.g., a cursor) to rotate to one or more of the options, which may be selected, for example, via a tap to the turntable, a back-n-forth rotational gesture to the turntable, etc.

As an example, a system may include a device and a turntable where the device responds to input via rotation of the turntable. As an example, the system may be a turntable-gesture system, for example, where gestures input via the turntable are sensed by the device and where the device can perform one or more actions based at least in part on the sensed gesture input.

Figure 4:
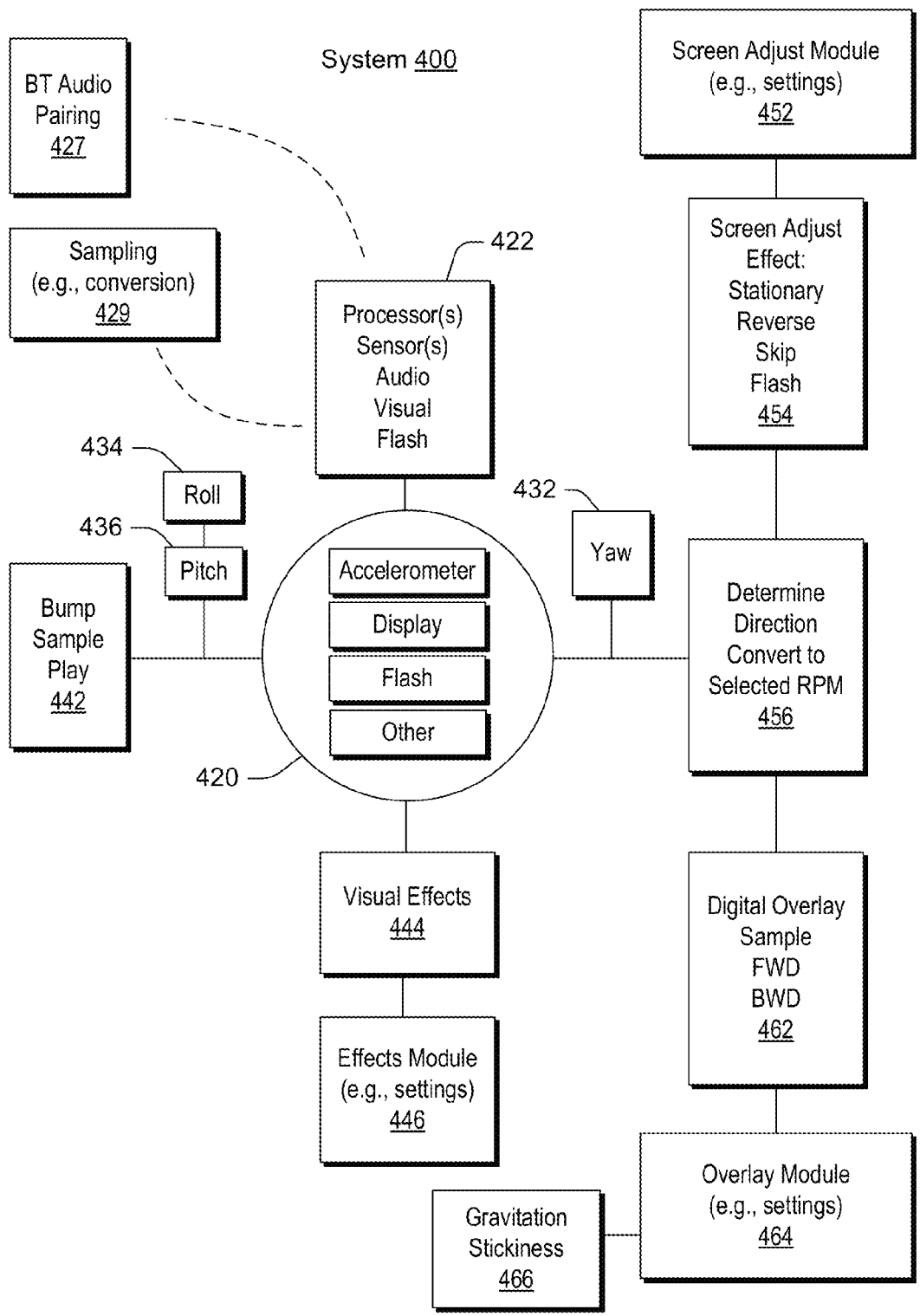
FIG. 4 illustrates a block diagram of a system.

FIG. 4 shows an example of a system 400. In the example of FIG. 4, the system 400 includes a central circle with blocks 420 that indicate some components of an electronic device that may be associated with turntable rotations. The blocks 420 may include an accelerometer block, a display block, a flash block and one or more other blocks. As illustrated, a block 422 may include circuitry such as one or more processors, one or more sensors, audio circuitry, visual rendering circuitry, flash circuitry, etc. The block 422 is shown as being operatively coupled to the central circle blocks 420. As an example, the block 422 may be circuitry of an electronic device that can be seated with respect to a turntable and that can respond to motion of the turntable such as rotation of the turntable.

As to communications, the block 422 may be operatively coupled to circuitry such as Bluetooth® circuitry 427 and/or other wireless communication circuitry (e.g., AirPlay circuitry (Apple Inc., Cupertino, Calif.), etc.). As an example, the block 422 may be operatively coupled to circuitry such as media sampling and/or conversion circuitry 429. As an example, such circuitry may be implemented at least in part via processor executable instructions that may be stored in memory of an electronic device seated with respect to a turntable (e.g., in a recess of a turntable).

In the system 400, various blocks represent actions, which may be functionality implemented by an electronic device seated in a turntable where the electronic device can sense motion and call for one or more actions in response to such sensed motion.

As an example, an electronic device may be configured with motion sensing circuitry to sense one or more of yaw 432, roll 434 and pitch 436. As an example, an electronic device may be seated in a recess of a turntable and rotated about an axis. In such an example, the electronic device may be seated flat with respect to gravity in that a display of the device defines a plane and where rotation of the device maintains the device substantially in the plane.

As an example, a recess of a turntable may seat a device at an angle, for example, to allow motion sensing circuitry to be slightly offset from gravity in that gravity, in terms of a vector, is not normal to a plane defined by axes of an x-accelerometer and/or a y-accelerometer.

As an example, an electronic device may include motion sensing circuitry that is offset from the geometric center of a device. Referring again to the turntable 110 of FIG. 1, in such an example, the motion sensing circuitry such as an accelerometer may be positioned at a radius and may rotate about a central axis (e.g., rotational axis) of the turntable at that radius (e.g., about a diameter).

Referring again to the system 400, motion sensing circuitry may implement one or more functions of a block 442, for example, consider bump, sample and/or play. As an example, motion sensing circuitry may implement one or more functions of a block 444, for example, consider visual effects, which may be caused by flashing of a flash unit of a device (e.g., electromagnetic energy emissions), etc. As an example, motion sensing circuitry may implement one or more functions of a block 446, for example, consider the block 446 as being an effects module that can set one or more setting for purposes of control of visual effects and/or other effects.

As shown, the system 400 can include a block 452 as a screen adjust module and a block 454 as a screen adjust effect module that may cause one or more effects that can be rendered to a screen/display of a device. For example, consider a stationary effect where rotation of the device does not rotate information rendered to a screen, a reverse effect where rotation in one direction of a turntable causes information rendered to a screen to be rotated in an opposite direction, a skip effect where information rendered to a screen may be skipped/jittered and a flash effect where information rendered to a screen may be flashed. As an example, various effects may be media coupled and/or motion coupled. For example, media coupled may act to couple effects to amplitude, beat, etc. of rendered media (e.g., songs); whereas, motion coupled may act to couple effects to rotation, rotational shifts, rotational speeds, rotational acceleration, etc. of a device as carried by a turntable. As an example, where media rendering is coupled to motion, one or more effects may be a hybrid motion/media coupled effect.

As an example, the system 400 can include a determination block 456 that acts to determine direction of rotation, for example, to convert a rotational motion to a particular rpm (e.g., akin to a turntable of a turntablist). As an example, the system 400 can include a digital overlay block 462 that can be implemented to sample sounds, to order data for play direction (e.g., forward or backward), etc. As an example, the system 400 may include an overlay module 464 that can include one or more settings, for example, to control a block 466 that can provide for gravitation and/or stickiness.

Figure 5:
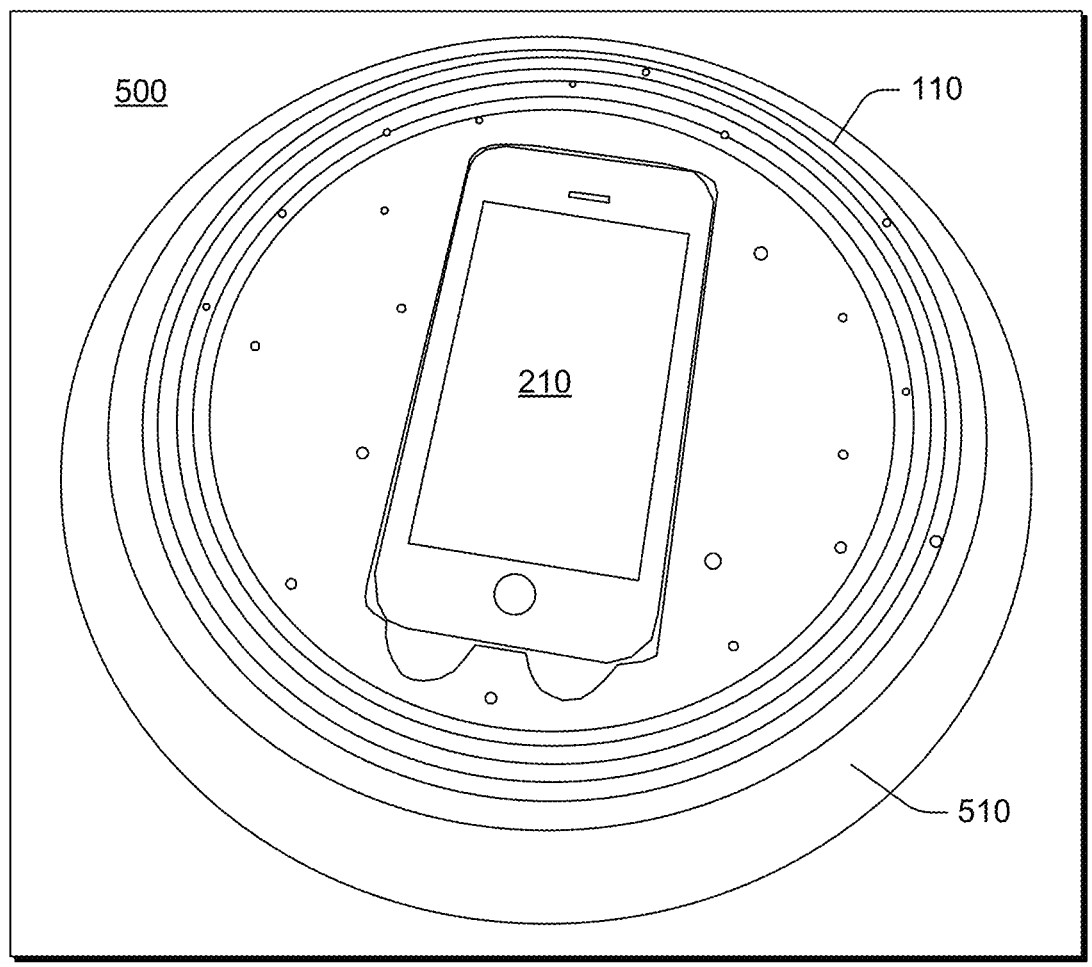
FIG. 5 illustrates a view of a system.
Figure 5:
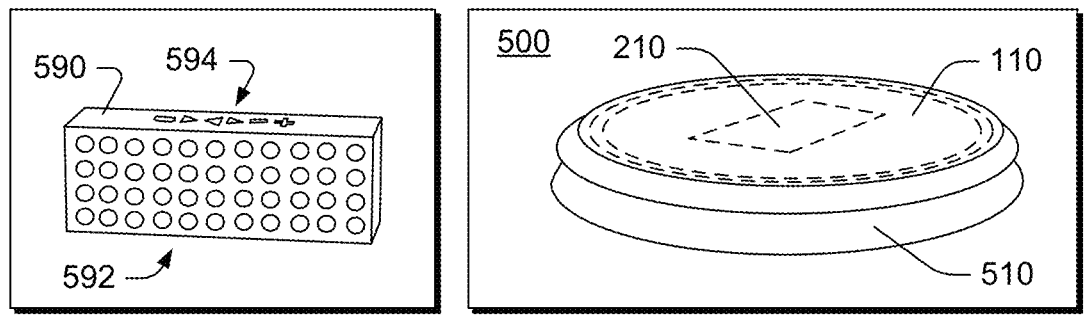

FIG. 5 shows an example of a system 500 that includes the turntable 110 of FIG. 1 with a base unit 510 (e.g., a base) where the device 210 of FIG. 2 is seated in the recess 130 of the turntable 110. In such an example, the base unit 510 may be a mount that can receive the turntable 110 and support the turntable 110 on a surface (e.g., on a desk, a table, etc.).

As an example, the system 500 may be provided as part of a kit that includes a speaker unit 590. As shown in the example of FIG. 5, the speaker unit 590 includes at least one speaker 592 and optionally actuatable controls 594. As an example, the speaker unit 590 may include Bluetooth® technology circuitry for wireless communication (e.g., handshakes, etc.) and receipt of information such as audio information. As an example, the Bluetooth® technology circuitry may provide a wireless range of up to about 33 feet (10 m) or more, it may be Bluetooth® compliant, it may support enhanced data rate (EDR), it may support one or more profiles such as, for example, the Advanced Audio Distribution Profile (A2DP), Hands-Free Profile (HFP), Headset Profile (HSP), and Serial Port Profile (SPP). The speaker unit 590 may include MyTALK framework capabilities (e.g., for Windows® OS, Mac® OSX, etc.). As an example, circuitry of the speaker unit 590 may be configured for simultaneous multipoint where it can operatively couple with multiple devices for transmissions.

As an example, the speaker unit 590 may include acoustic drivers, passive bass radiators, a built-in microphone, an IEEE 1329 Type 1-compliant speakerphone, a stereo input jack, a USB port (e.g., for updating on the MyTALK framework). As an example, the speaker unit 590 may include features of one or more Jambox® speaker units such as the Mini Jambox® speaker unit and/or the Big Jambox® speaker unit (e.g., wireless speaker) marketed by Jawbone (San Francisco, Calif.). The Big Jambox® speaker unit has a length of about 10" (256 mm), a width of about 3.1" (80 mm), a height of about 3.6" (93 mm) and a weight of about 2.7 lbs (1.23 kg) and includes battery power for up to about 15 hours of continuous play where battery life may be displayed on a compatible device operatively coupled with the unit (e.g., consider the device 210). As an example, the device 210 of the system 500 may optionally render battery life to a display of the device 210, for example, consider a low battery signal that alerts a user that a coupled wireless speaker unit such as the unit 590 is low on power.

As an example, the turntable 110 may be rotatably coupled to the base unit 510, for example, where friction is reduced through use of one or more bearing elements. As an example, consider stainless steel ball bearings that may be disposed between races (e.g., an upper race and a lower race). As an example, to reduce friction (e.g., sliding), the base unit 510 may include rubbery feet, a rubbery pad, etc. As an example, the base unit 510 may have a dimension (e.g., diameter) that is larger than that of the turntable 110, which may act to prevent interference with rotation of the turntable 110 where the system 500 is positioned next to another object (e.g., on a surface). As an example, a turntable may be about a foot in diameter, noting that other sizes may be used. As an example, a turntable may be sized to carry an electronic device and allow for rotation. As an example, a kit may include a turntable (e.g., with a base unit) with a diameter of about a foot or less and a portable speaker unit with wireless communication circuitry for transmission of at least audio information from an electronic device to the portable speaker unit. As an example, such a kit may include a carrying bag.

Referring to the turntable 110 of FIG. 5, as an example, the recess 130 may be configured to receive an electronic device with an interference fit. For example, a turntable may be made of a material that includes an amount of elasticity such that it may be slightly smaller in one or more dimensions than an electronic device and such that it may expand to receive an electronic device. As an example, one or more carriers may be implemented such as an elastomeric carrier that can receive an electronic device and fit the electronic device into a recess of a turntable. As an example, a turntable may include an elastomeric layer that may be within a recess that can change shape to accommodate one or more different types of electronic devices. As an example, a turntable may include an elastomeric element (e.g., an "O-ring" configured rectangularly) with respect to a recess where the elastomeric element may accommodate an electronic device and secure the electronic device with respect to the turntable. As an example, where a type of interference fit may be implemented, force for removal and insertion may be determined based on force applicable by a human hand (e.g., consider the hand of a child of 5 years old). As an example, a turntable may include a locking mechanism that may be actuated to lock an electronic device with respect to a turntable. For example, consider one or more tabs that may swing to secure an electronic device with respect to a turntable.

As an example, a system may be configured with circuitry that can compensate for displacements with respect to a direction of gravity. For example, consider mounting of the system 500 on a slanted board. In such an example, the device 210 may detect its angle with respect to gravity and compensate motion sensing circuitry or signals therefrom with respect to the detected angle. In such an example, the device 210 may operate as if the system 500 were positioned on a level, horizontal surface.

As an example, the turntable 110 of FIG. 1 may be a table that can be operatively coupled to a base unit where the base unit includes one or more bearings, etc. that allow for rotation of the table. As an example, a turntable such as the turntable 110 of FIG. 1 may include one or more bearings that allow for it to be rotated about a central, rotational axis.

Figure 6:
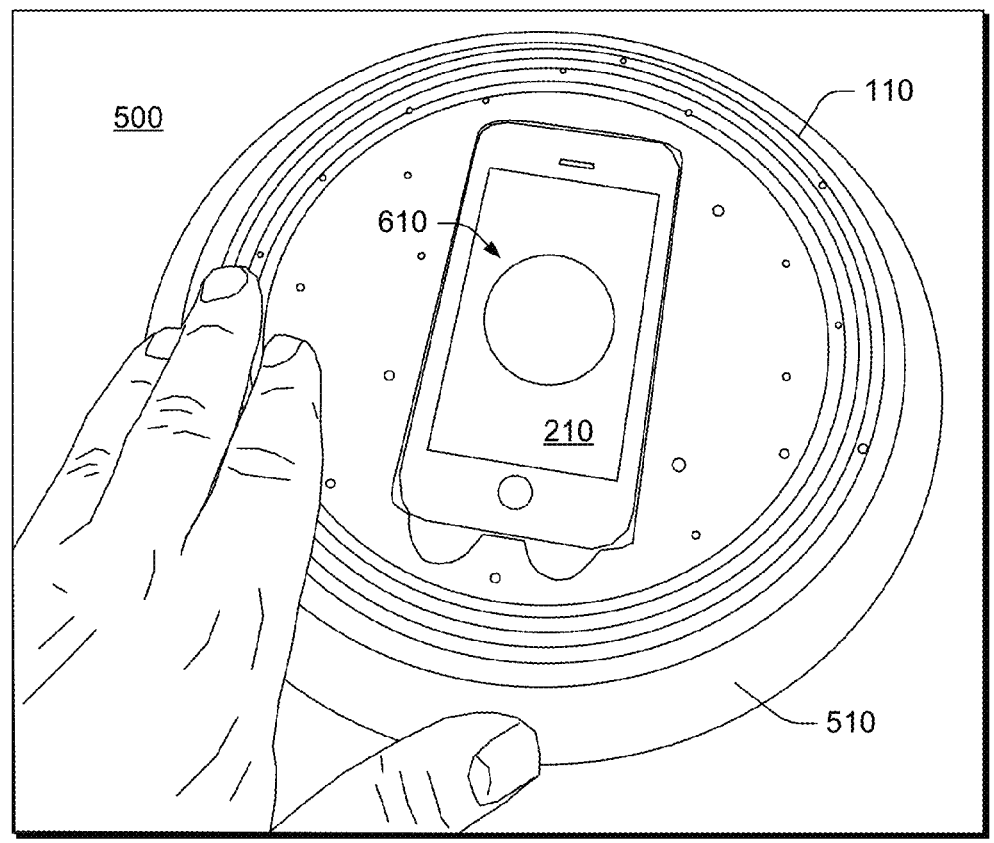
FIG. 6 illustrates a view of the system of FIG. 5 and an example of a method.
Figure 6:
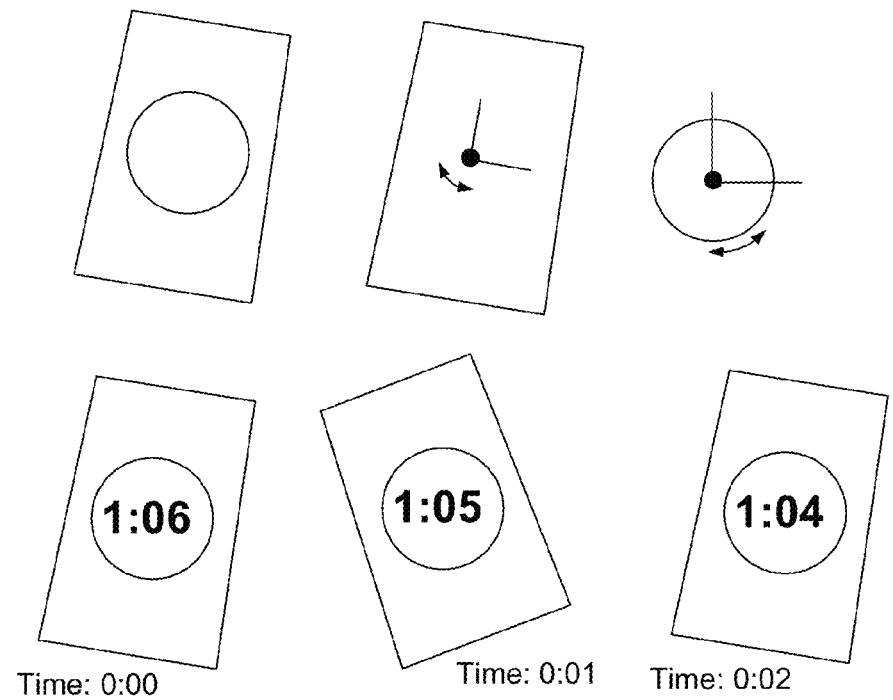

FIG. 6 shows an example of the system 500 with respect to an operational scenario. In the example of FIG. 6, information 610 is rendered to the display of the device 210. As illustrated, depending on one or more operational settings, the rendered information may be maintained in a stationary reference frame with respect to a rotational reference frame. As an example, the information rendered may be information associated with media being rendered via media player circuitry, for example, to speakers of the device 210. Such media may be of a particular track time, for a given play speed. As an example, the device 210 may render a track time counter that stays "stationary" while the turntable 110 is being rotated in one or another rotational direction (e.g., clockwise or counter-clockwise). For example, at a time 0:00, the track time counter may be at 1:06 and a user may rotate the turntable 110 counter-clockwise such that one second later the track time counter is at 1:05, yet still maintained in a reference frame that may be a viewing reference frame for the user. Where the user rotates the turntable clockwise, for example, at a time 0:02, the track time counter may display 1:04 while still being maintained in a "stationary" reference frame. In such a manner, a user may be readily informed about media information without worrying about the rotational position of the device 210 as seated in the recess 130 of the turntable 110.

While the example of FIG. 6 shows track time, other information may be displayed, for example, even phone call information, which may include a live chat session information where video is streamed to the device 210 via a network. In such an example, the user of the system 500 may see a caller and communicate with the caller while using the device 210 as part of the system 500 for controlling media rendering. In other words, where the device 210 is configured with communication circuitry such as cellular phone circuitry, it may be a multi-mode device that can operate in multiple modes simultaneously.

As an example, consider a dance club scenario where a DJ gets a call from a manager, the DJ may answer the call optionally without interrupting media rendering, i.e., the party goes on. In such an example, the DJ may utilize a headset such as a Bluetooth® headset to communicate with the caller via a device seated in a turntable. Again, where the call is a video call, video may be rendered to the display of the device and optionally in a "stationary" manner.

Figure 7:
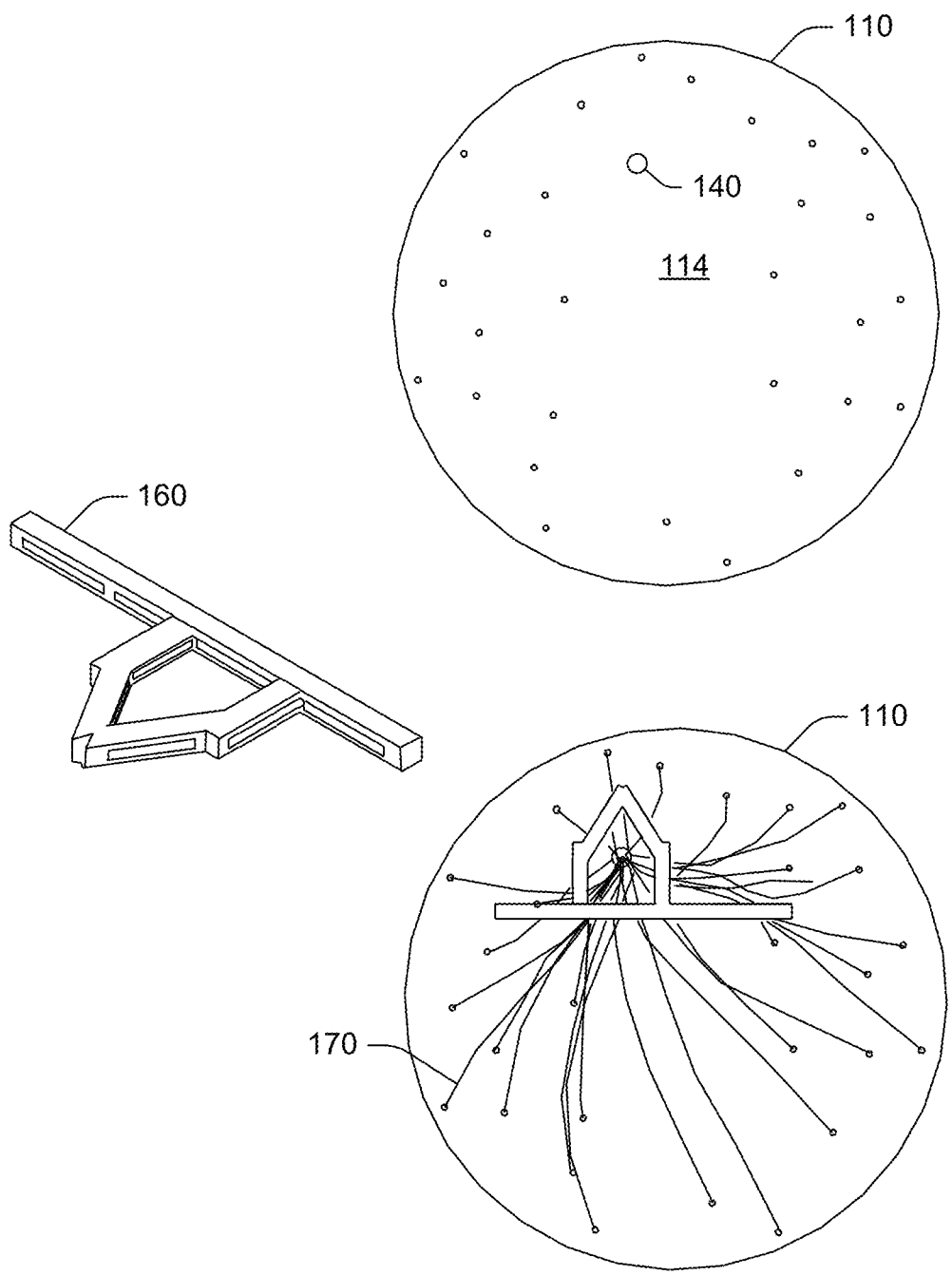
FIG. 7 illustrates views of examples of components associated with waveguides.

As mentioned, the turntable 110 of FIG. 1 may be configured with one or more waveguides. FIG. 7 shows an example of the turntable 110 together with a coupling component 160 and a plurality of optical fibers 170. As shown, the optical port 140 may extend to the surface 114 of the turntable 110 and receive a bundled end of the plurality of optical fibers 170. In such an example, the coupling component 160 may help position and secure the plurality of optical fibers 170 where each of the optical fibers extends to a passage (see, e.g., the passage 122) of the turntable 110. As an example, a passage may open to the surface 112 of the turntable 110 or to another surface such as the peripheral surface 116 of the turntable 110.

Figure 8:
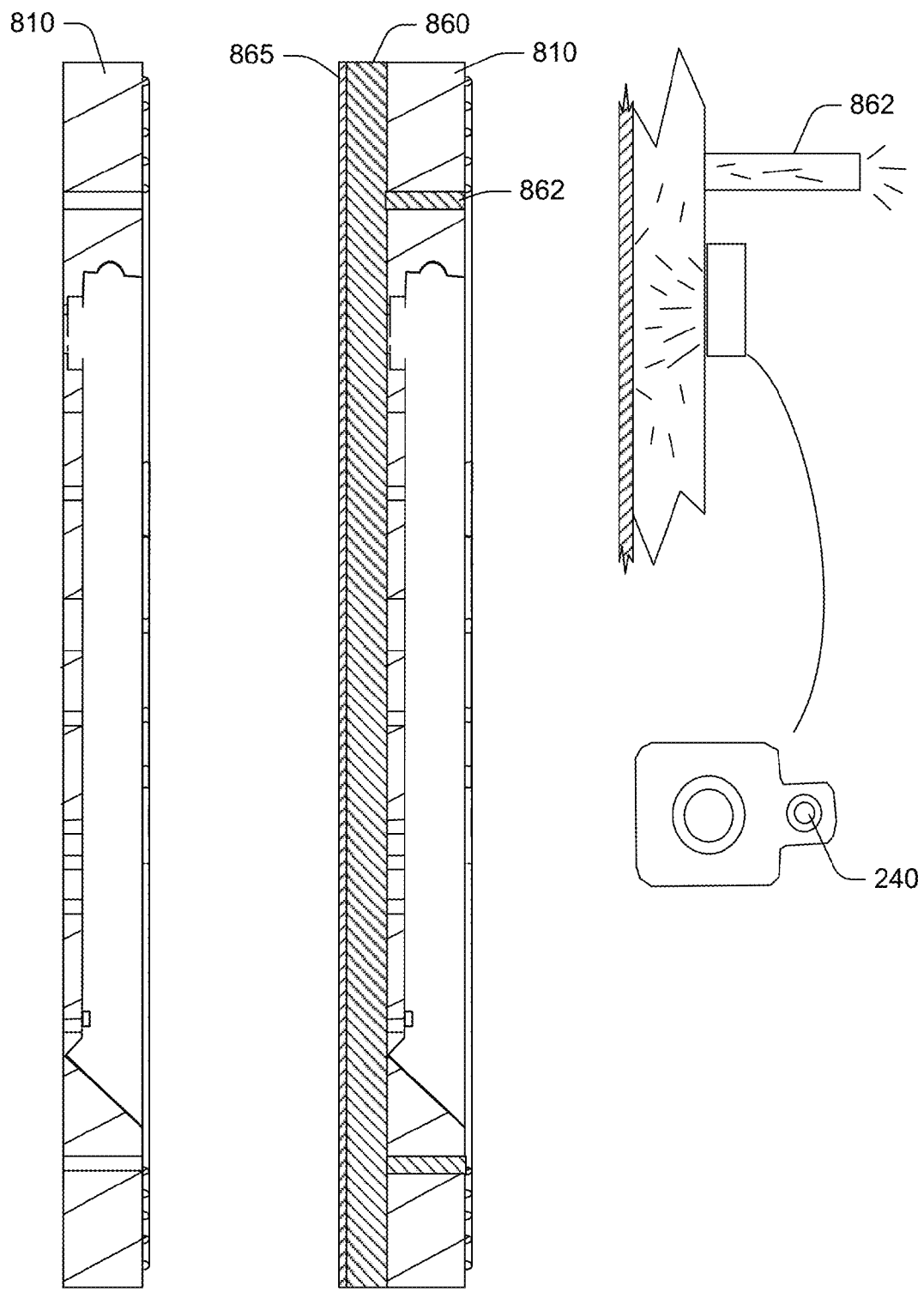
FIG. 8 illustrates views of an example of a turntable with examples of waveguide components.

FIG. 8 shows an example of a turntable 810 that can include a passage 862 and an optical waveguide 860 that may include a reflective surface 865. As an example, the flash unit 240 of the device 210 may be directed to the optical waveguide 860 to couple electromagnetic energy emissions from the flash unit to the optical waveguide 860 for transmission to one or more passages such as the passage 862. As an example, the optical waveguide 860 may be a polymeric material (e.g., poly(methyl 2-methylpropenoate) "PMMA", polycarbonate, etc.).

As an example, a turntable may include light generating circuitry. For example, consider a turntable that includes a power source (e.g., one or more batteries) and one or more LEDs, laser diodes, etc. In such an example, the light generating circuitry may be controlled via signals from an electronic device carried by the turntable and/or respond to sound waves, rotation, bumping, etc.

Figure 9:
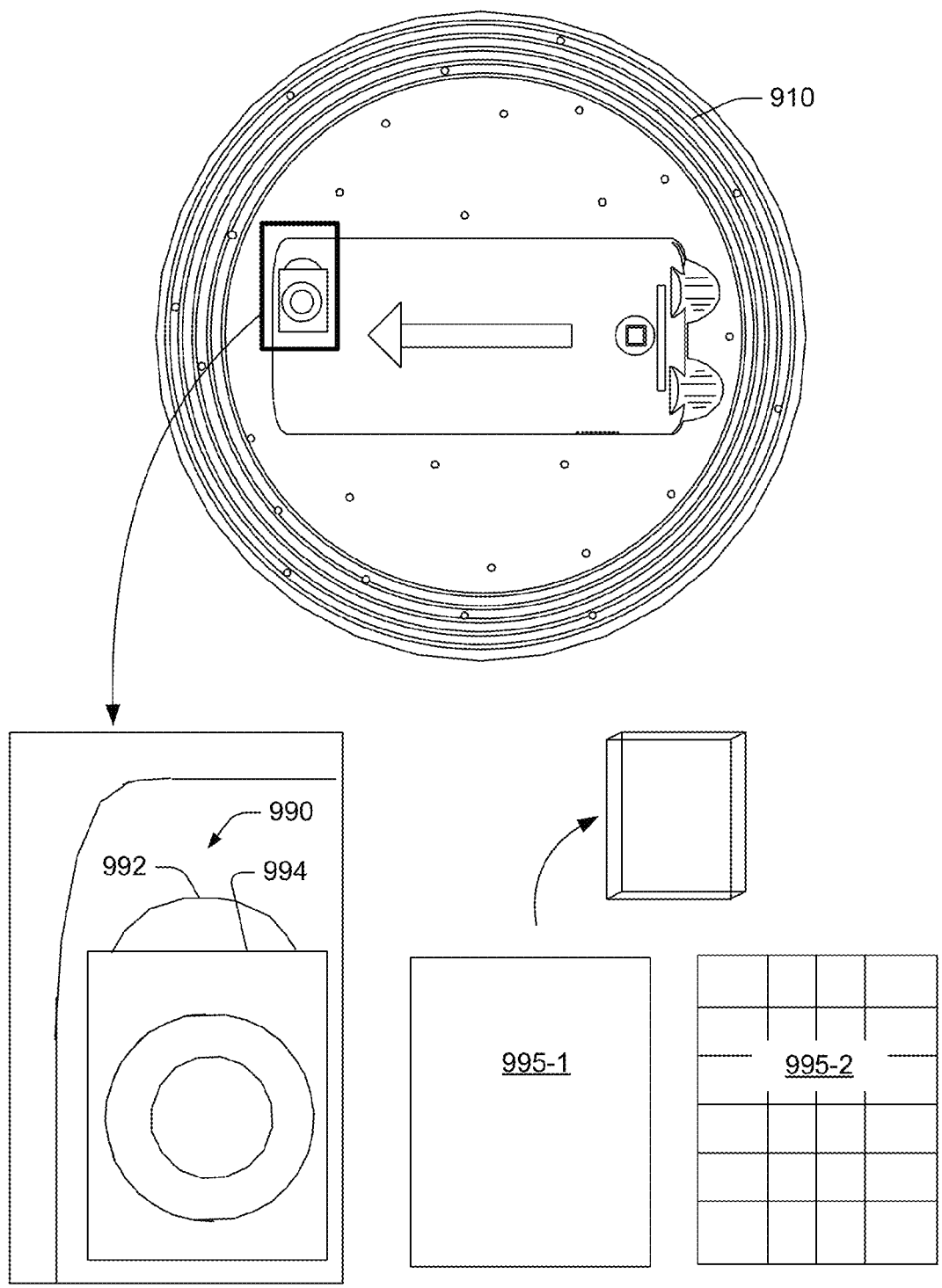
FIG. 9 illustrates views of an example of a turntable that can receive filters.

FIG. 9 shows an example of a turntable 910 that includes a filter arrangement 990 that includes a slot 992 adjacent to a filter recess 994. In such an example, one or more filters (e.g., consider a red filter 995-1 and a multicolor filter 995-2) may be positioned in the filter recess 994, for example, to alter the color of flashes emitted by a device that includes a flash unit. For example, the red filter 995-1 may be positioned in the filter recess 994. A user may insert a finger nail in the slot 992 for removal of the red filter and then replace the red filter 995-1 with the multicolor filter 995-2 (e.g., a kaleidoscopic filter). As an example, the depth of the filter recess 994 may allow for stacking filters. As an example, a turntable may include a storage feature for storage of one or more filters. For example, consider a series of dummy recesses disposed in the floor 131 of the turntable 110 of FIG. 1 where the dummy recesses may store a plurality of filters where one or more of the filters may be selected by a user, removed from a respective dummy recess and placed into a filter recess that covers the optical port 140 of the turntable 110. As an example, a turntable may be provided as a kit with a plurality of filters.

Figure 10:
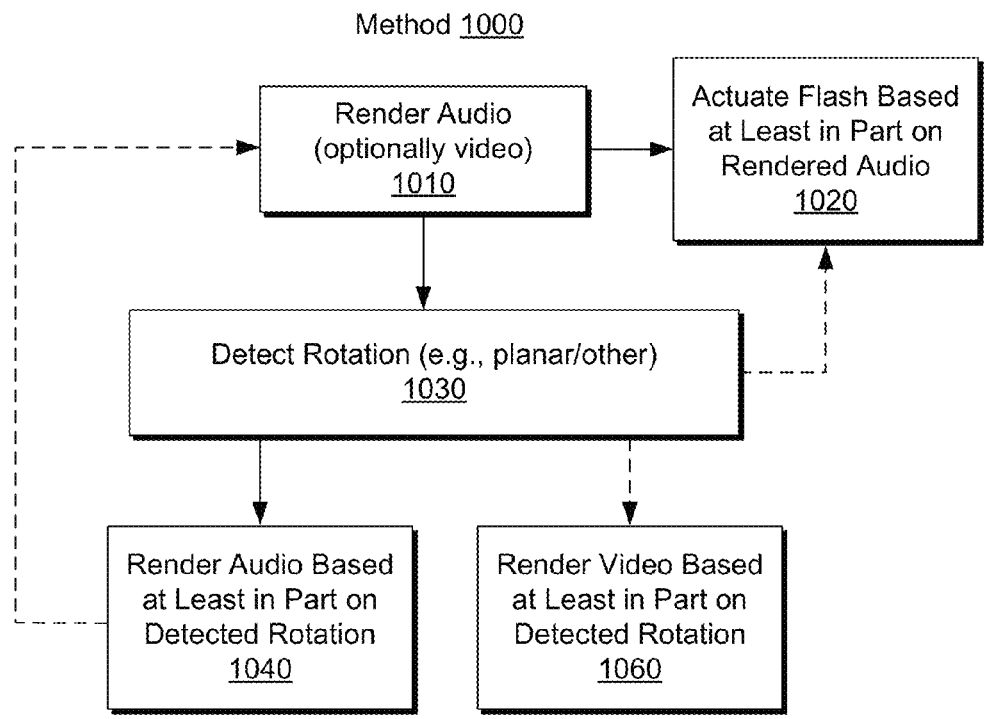
FIG. 10 illustrates a block diagram of an example of a method and a block diagram of an example of a device.
Figure 10:
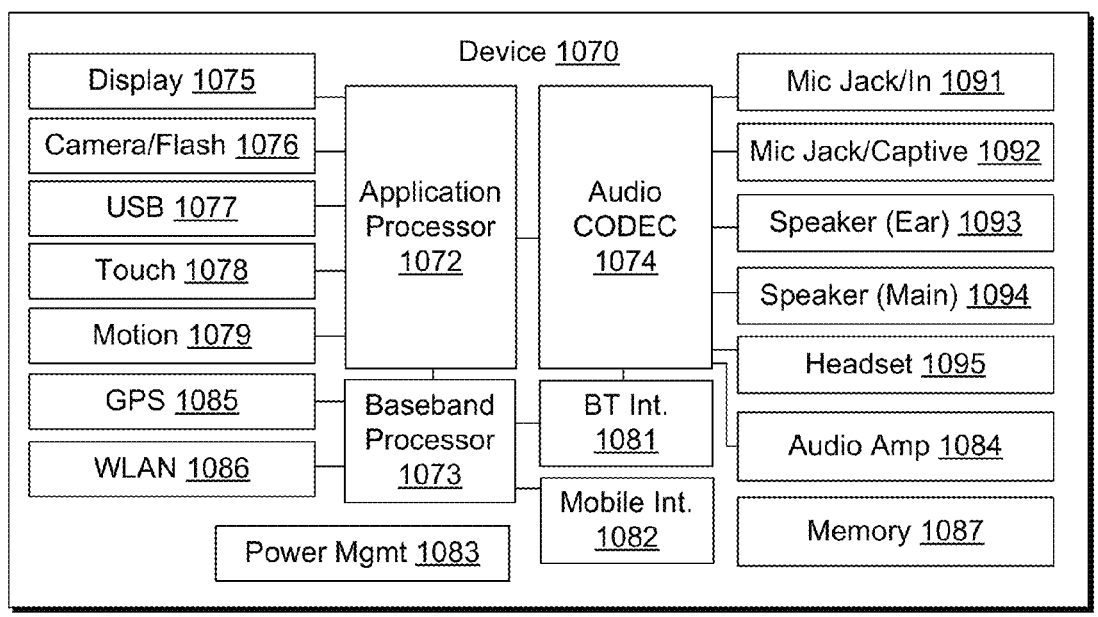

FIG. 10 shows an example of a method 1000 and an example of a device 1070. The method 1000 includes a render block 1010 for rendering audio and optionally video, a detection block 1030 for detecting rotation and a render block 1040 for rendering audio based at least in part on the detected rotation and optionally a render block 1060 for rendering video based at least in part on the detected rotation. As shown in the example of FIG. 10, the method 1000 can include an actuation block 1020 for actuating a flash based at least in part on rendered audio and/or, for example, based at least in part on the detected rotation. As an example, the method 1000 may loop, as indicated by a dashed line from the block 1040 to the block 1010.

In FIG. 10, the device 1070 includes an application processor 1072, a baseband processor 1073, an audio codec 1074, a display 1075 (e.g., including display driver circuitry), a camera/flash sub-system 1076, a USB port 1077, touch sensing circuitry 1078, motion sensing circuitry 1079, Bluetooth® circuitry 1081, mobile circuitry 1082, power management circuitry 1083, audio amplification circuitry 1084, GPS circuitry 1085, WLAN circuitry 1086, memory 1087, a microphone jack in 1091, a captive microphone 1092, a captive speaker 1093, one or more additional speakers 1094, and headset out/circuitry 1095. Various types of interfaces may exist between circuitry of a device such as the device 1070. As an example, consider an I$^2$S interface, which may, for example, operatively couple the application processor 1072 and the audio codec 1074; the baseband processor 1073 and the audio code 1074; and the Bluetooth® circuitry 1081 and the audio codec 1074.

As an example, the audio code 1074 may include an integrated, low-power smart audio codec that can serve as a mobile audio distribution network incorporating multiple digital/analog converters (DACs) and an ADC, for example, with ground centered headphone, line and speaker amplifiers for smartphone and portable applications. As an example, such an audio codec may include three asynchronous bidirectional serial ports with integrated asynchronous sample rate converters (ASRCs) that may accept a range of incoming audio sample rates, for example, to feed an integrated digital mixing engine (e.g., consider the Cirrus Logic CS42L73 audio codec, the datasheet of which is incorporated by reference herein "CS42L73_F1.pdf"). Such an engine may be configured to overlay (e.g., optionally simultaneously) and distribute digital audio from multiple sources to one or more its integrated audio nodes, for example, to provide routeability within an electronic device.

As an example, circuitry can include a digital mixer that can mix and route inputs (e.g., analog inputs to ADC, digital microphone, serial ports, etc.) to outputs (e.g., DAC-fed amplifiers, serial ports, etc.). As an example, a digital mixer may include features for independent attenuation on individual mixer input for individual output. As an example, processing along one or more output paths from a digital mixer to one or more DACs can optionally include volume adjustment and, for example, mute control. As an example, a peak-detector may be implemented to automatically adjust one or more volume levels via a programmable limiter. As an example, circuitry such as audio codec circuitry may be controllable via one or more busses. For example, consider an $I^2C$ bus that may be coupled to an $I^2C$ interface of audio codec circuitry such that the audio codec circuitry may respond to instructions executed by a processor (e.g., according to one or more applications, etc.). As an example, media player circuitry may include audio codec circuitry. As an example, media player circuitry may include an application executable via a processor that can instruct circuitry such as audio codec circuitry.

As an example, circuitry such as audio codec circuitry may operatively couple with wireless communication circuitry via lines such as clock and data lines (e.g., XSP_L-RCK, XSP_SCLK, XSP_SDIN, XSP_SDOUT). As an example, an audio codec may be operatively coupled to one or more serial ports, which may be independent (e.g., consider the XSP, ASP, and VSP serial ports of the Cirrus Logic CS42L73 audio codec) and may be configured to communicate audio (e.g., and voice) data to and from components such as, for example, an application processor, a Bluetooth® transceiver, a cell-phone modem, etc.

$I^2S$, also known as Inter-IC Sound, Integrated Interchip Sound, or IIS, is an electrical serial bus interface standard that can be implemented for operatively coupling one or more digital components with respect to audio information. For example, it may be implemented to communicate PCM audio data between integrated circuits in an electronic device. The $I^2S$ bus can separate clock and serial data signals, which may result in a lower jitter compared to communications techniques that recover the clock from a data stream.

As an example, the method 1000 may be performed via the device 1070. For example, one or more modules may be stored in the memory 1087 of the device 1070 where the one or more modules include processor-executable instructions to cause one or more of the processors (e.g., and/or other circuitry) of the device 1070 to perform one or more actions of the method 1000.

As an example, an application may be stored in memory of a device and executed in an OS environment established by the device where the application may include statements that can make one or more API calls. As an example, such an application may couple motion, audio, video, flash, etc. For example, motion may control audio, motion may control flash, motion may control video, audio may control flash, audio may control video, etc. As an example, where a device includes a touchscreen, graphical user interfaces may be rendered to the touchscreen that can include graphical controls actuatable via touch, which may be single point touch, multipoint touch, gesture touch, etc. As an example, a device may be configured to transmit audio information to a speaker unit. In such a manner, where the device is carried by a turntable, motion sensed by the device may control processing of audio information where processed audio information may be transmitted wirelessly to the speaker unit to generate acoustic waves. As an example, a device carried by a turntable may include an application that can transmit information to one or more effects units such as lighting units, pyrotechnic units, etc. As an example, consider bumping of the turntable to cause flashing of one or more lights (e.g., LED, laser, spots, etc.) controlled via a base unit that can receive control signals wirelessly from the device (e.g., directly and/or indirectly). A turntablist may use such a system to put on an audio and visual show (e.g., a dance club style show).

Figure 11:
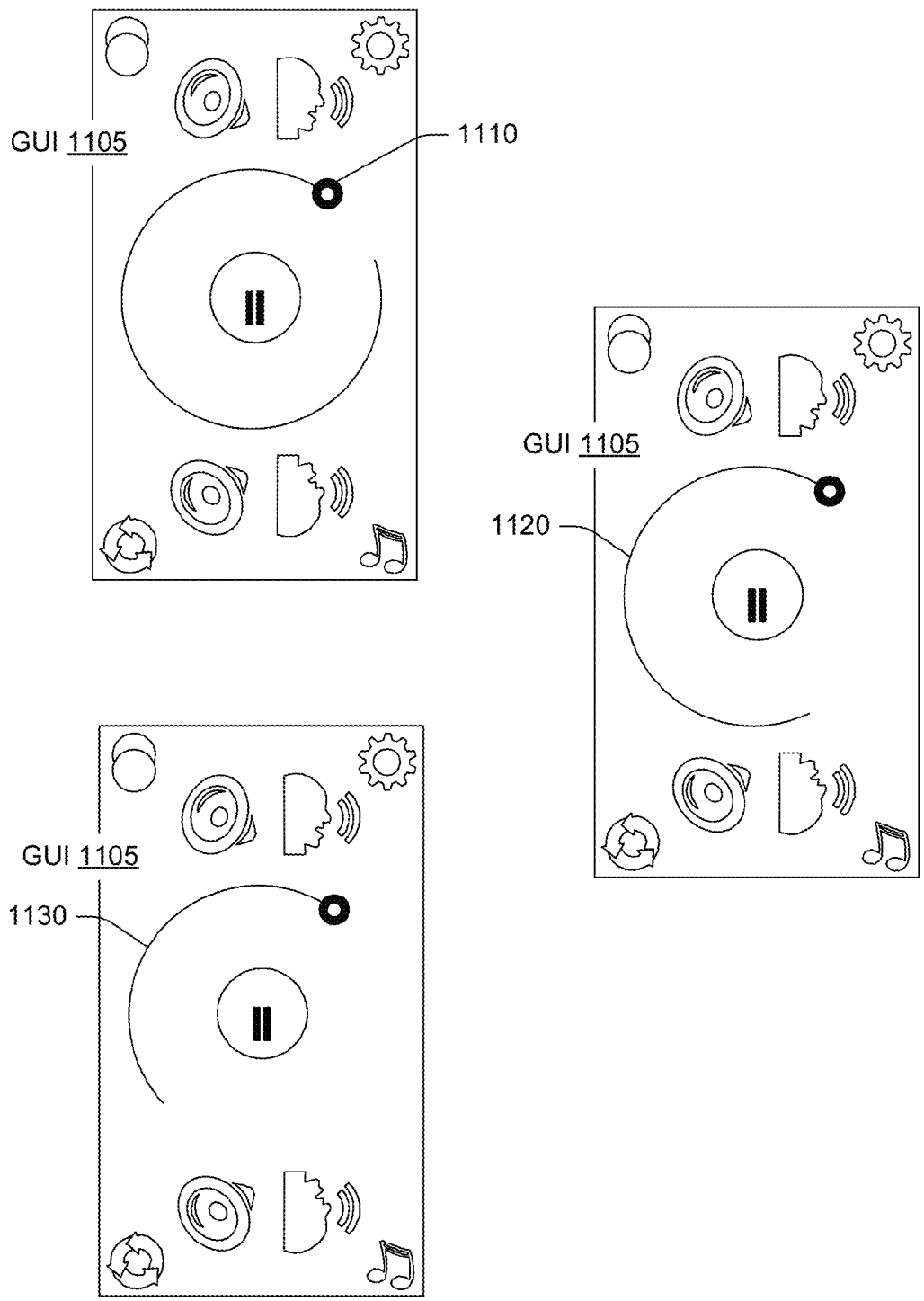
FIG. 11 illustrates a series of views of an example of a graphical user interface.

FIG. 11 shows an example of a method 1100 with respect to an example of a graphical user interface (GUI) 1105. In the example of FIG. 11, the method 1100 includes rendering a timer graphic. As shown, the timer graphic decreases in size from an initial time 1110, to an intermediate time 1120 to a later time 1130. Such a timer graphic may be implemented for one or more purposes. For example, the method 1100 illustrates the timer graphic of the GUI 1105 as being for purposes of a voice recording.

Figure 12:
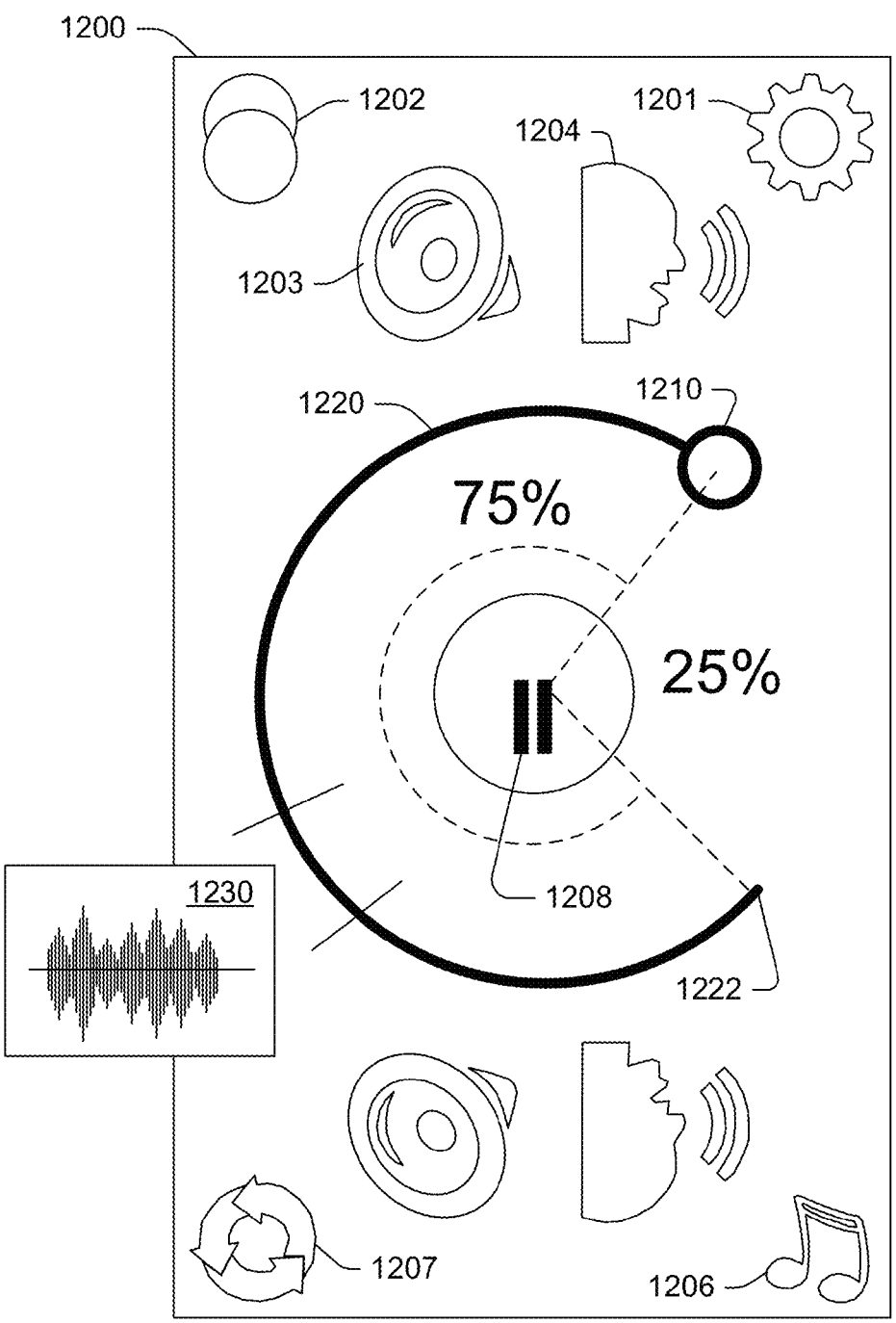
FIG. 12 illustrates an example of a graphical user interface.

FIG. 12 shows an example of a graphical user interface 1200 with respect to various features. For example, the GUI 1200 includes a tool control 1201 (e.g., for background, sound, flash, etc.), a sound effects/overlay control 1202, a media selection control 1203, a record control 1204, a song selection control 1206, a pulsating real-time motion graphic 1207 and a play/pause control 1208.

FIG. 12 also shows the GUI 1200 as including an indicator 1210 that can be displayed in conjunction with a variable length arc 1220. In such an example, a sample (e.g., a media sample) may be specified according to a play length where 360 degrees may represent the play length. As an example, an end of the arc 1222 may define a "start" point of a sample and the indicator 1210 may indicate the "current" point of the sample. For example, as shown, 75% of the sample has been played or, put another way, the current "play point" in the sample is at 75% of the sample's play length. Where the sample is about 10 seconds in play length, the sample may be at about 7.5 second in with about 2.5 seconds remaining; noting that whether the sample is advanced forward in time or reverse in time can depend on direction of rotation of a device.

As an example, the indicator 1210 and the variable length arc 1220 can "track" rotational motion of a device seated with respect to a turntable. For example, where a user selects a sample, the indicator 1210 may be displayed without the variable length arc 1220 (i.e., the sample is at time 0). As the device is rotated, the variable length arc 1220 extends away from the indicator 1210 in the appropriate direction of rotation (e.g., clockwise or counter-clockwise). In such an example, a user can see where she is at a given point in time with respect to the sample. As an example, options can exist to make the indicator 1210 position fixed with respect to a frame of reference. For example, consider the indicator 1210 being fixed with respect to a user's frame of reference such that the relative position is maintained even though a device that displays the GUI 1200 is being rotated clockwise or counter-clockwise.

FIG. 12 also shows a portion of a sample 1230 that may be repeatedly played back and forth, for example, by rotating a device such that the end of the arc 1222 traverses that portion of the sample (e.g., over an arc angle). Thus, a user may maneuver a turntable clockwise and counter-clockwise over the portion of the sample 1230 to repeatedly play backward and/or forward (e.g., depending on settings) the portion of the sample 1230. As an example, a sample can include various sounds that may be visualized with respect to length of the sample by association with degrees about an arc or a circle. For example, the portion of the sample 1230 may correspond to a chicken sound while ahead of that portion of the sample, another portion may provide for a dog sound.

The GUI 1200, particularly, the features 1210 and 1220, may be considered DJ gesture feedback features that may optionally be presented with respect to one or more frames of reference (e.g., reference frames). Such features may allow for more deliberate actions and repetition of such actions by a DJ (e.g., a turntablist).

As mentioned, the GUI 1200 also includes various features for overlays. For example, a graphic control may be touched to render another GUI for purposes of recording, sound selection, etc. A song may be a base track while one or more overlays may be selected and/or created and manipulated for playback.

As to the graphic 1207, it may indicate a length of a sample and it may pulse in time, for example, to keep a beat. As an example, the graphic 1207 may present information as to time (e.g., "6 second" sample). As an example, the graphic 1207 may include one or more directional arrows that may shift in direction in response to direction of rotation of a device seated with respect to a turntable (see, e.g., the system 500 of FIG. 5).

As an example, a device may include a feature that can turn an overlay track off, for example, leaving a music track (e.g., a song file) isolated to be manipulated by itself. As an example, a device may be switchable from one mode of operation to another mode of operation where such operational modes can provide for controlling one or more tracks (e.g., layers) in one or more manners.

Figure 13:
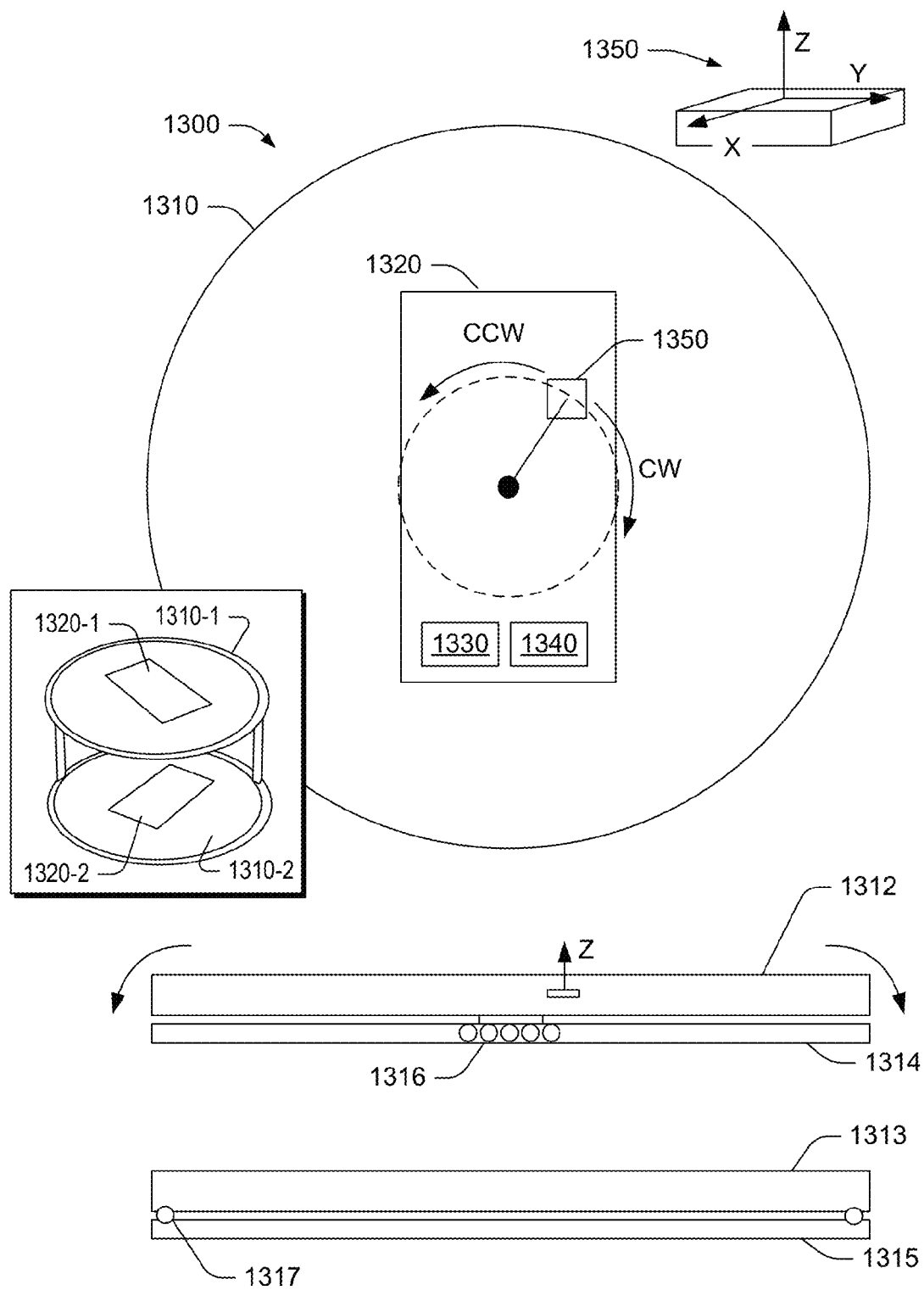
FIG. 13 illustrates an example of a system.

FIG. 13 shows an example of a system 1300 that includes a turntable 1310 and a device 1320 that is located with respect to the turntable 1310, which may include a circular profile or other profile while being at least rotatable about an axis. As an example, a system may be a "stacked" or "tiered" system or other configuration of multiple systems (e.g., with support columns, etc., that can stack turntables/bases). FIG. 13 shows an example of a stacked turntable system with a turntable 1310-1 and a turntable 1310-2 with devices 1320-1 and 1320-2, respectively. In such an example, two-handed control may be implemented to control the turntable 1310-1 with one hand the turntable 1310-2 with another hand (e.g., of a same user or two users). In such an example, the device 1320-1 and 1320-2 may be operatively coupled to each other and/or to one or more other units (e.g., speaker unit, other electronics unit, etc.).

In the example of FIG. 13, the device 1320 (e.g., or devices 1320-1 and 1320-2) can include a processor 1330, memory 1340 and motion sensing circuitry 1350. As an example, the motion sensing circuitry 1350 may include multi-axis motion sensing circuitry such as one or more of a gyroscope and an accelerometer (e.g., consider a STMicroelectronics L3G4200D unit, a Bosch BMA220 unit, etc.). As an example, the motion sensing circuitry 1350 may include a tri-axial, low-g acceleration sensor with digital interfaces and/or a three-axis gyroscope.

As shown in FIG. 13, the system 1300 may include a turntable component 1312 that is rotatably mounted to a turntable component 1314, which may be a base. As shown, a rolling element cartridge 1316 may rotatably couple the turntable components 1312 and 1314. In such an example, a clearance may exist between the components 1312 and 1314 such that pivoting of the component 1312 may occur with respect to the component 1314. In such an example, the pivoting may allow for bumps that tilt the component 1312 with respect to a z-axis, which may be a z-axis of the motion sensing circuitry 1350.

As another example, the system 1300 may include a turntable component 1313 that is rotatably mounted to a turntable component 1315, which may be a base. As shown, rolling elements 1317 may rotatably couple the turntable components 1313 and 1315. In such an example, while pivoting may be limited compared to the arrangement of the components 1312 and 1314 via the cartridge 1316, the motion sensing circuitry 1350 may still respond to bumps, for example, that may be sensed as acceleration by the motion sensing circuitry 1350.

As an example, the processor 1330 may execute instructions stored in the memory 1340, for example, to perform actions based at least in part on information sensed by the motion sensing circuitry 1350. As an example, the device 1320 may include media player circuitry, optionally in the form of a media player application that may be executed by the processor 1330, which may direct circuitry to render audio, record audio, etc. As an example, the device 1320 may include one or more microphones, one or more speakers, one or more communication circuits, etc. As an example, communication circuitry may be provided for purposes of transmitting signals wirelessly to one or more devices such as a device that include communication circuitry and a speaker.

As an example, consider a technology referred to as AirPlay technology. Such technology may be implemented by various types of devices. For example, consider two types of AirPlay devices: those configured with circuitry for sending audio/visual content and those configured with circuitry for receiving content and rendering it via a display/speaker.

Wireless technology may be integrated as circuitry into speaker docks, AV receivers, multi-phonic systems, etc. As an example, information such as metadata information may be transmitted, for example, consider song titles, artists, album names, elapsed and remaining time, and album artwork. As an example, a DJ application executing on a device may include features for transmitting graphics, artwork, etc. to one or more displays. As an example, a DJ application executing on a device may include features for managing light shows, pyrotechnics, etc. As an example, a device may receive information via a motion sensor and respond by issuing one or more triggers that act to trigger a light, a special effect, a pyrotechnic, etc. As an example, a light may be a laser light, a stage light, an LED light or display, etc.

As an example, one or more Bluetooth® technology enabled devices (e.g., headsets, speakers, etc.) may support an A2DP profile and appear as AirPlay receivers when paired with an iOS device or other device; noting that Bluetooth® technology may operate via a device-to-device protocol (e.g., one that does not require on a wireless network access point).

As an example, a stream may be transcoded using a codec (e.g., for 44100 Hz and 2 channels, optionally encrypted). As an example, depending on technology implemented, a stream may be buffered prior to playback, which may result in a short delay.

As an example, to reduce delay, a technology may be implemented whereby a device is positioned in close proximity to a system. As an example, a component such as the component 1314 or the component 1315 may include circuitry that can receive transmissions from the device 1320. As an example, wired and/or wireless circuitry may be implemented. As an example, the component 1314 or the component 1315 may include one or more ports, for example, to connect wires that may be coupled to amplifiers, speakers, etc.

As an example, a base unit that rotatably supports a turntable may include circuitry such as circuitry that can power an electronic device carried by the turntable. In such an example, the turntable may include circuitry that operatively couples with the circuitry of the base unit. As an example, a turntable system may include inductive charging circuitry. Inductive charging (or "wireless charging") uses an electromagnetic field to transfer energy between two objects. Inductive charging can be implemented using a charging station where energy is sent through an inductive coupling to an electrical device, which can then use that energy to charge batteries or run the device.

Charging circuitry can include an induction coil that can create an alternating electromagnetic field from within a charging base station and a second induction coil in/operatively coupled to an electronic device that can take power from the electromagnetic field and, for example, converts to electrical current to charge a battery, power the device, etc. Two induction coils in proximity can form an electrical transformer. As an example, greater distances between sender and receiver coils may be achieved where an inductive charging system implements resonant inductive coupling.

As an example, an electronic device may be fit with a charging circuitry, optionally as a charging case. As an example, a system may include circuitry such as that of one or more of the Duracell® Powermat system (Procter & Gamble, Cincinnati, Ohio), the iQi Mobile charger system (iQi Mobile, London, UK), etc. The iQi Mobile charger system for the iPhone device includes a relatively thin receiver (e.g., about 0.5 mm) and a flexible ribbon cable (e.g., about 1.4 mm) that runs to a lightning connector, allowing the receiver to remain plugged in when folded behind the device. The Duracell® Powermat system for the iPhone device includes the AccessCase case with an inductive coil that sits just below the device's lightning port.

As an example, a turntable may include circuitry such as receiver circuitry for inductive charging and a plug for plugging into an electronic device that can be carried by the turntable. As an example, an electronic device may include or be fit with receiver circuitry for inductive charging. As an example, a base that rotatably supports a turntable may include circuitry that can generate electromagnetic fields for inductive charging. As an example, a turntable and/or receiver circuitry may be operatively coupled to or include a supplemental battery. As an example, a turntable may include a supplemental battery, optionally with or without inductive charging circuitry. As an example, consider a supplemental battery rated at about 2000 mAh. Such a battery may provide power for an electronic device carried by a turntable.

As an example, inductive charging circuitry may provide for powering/charging an electronic device where the electronic device is stationary and/or moving (e.g., rotating via a turntable).

As an example, a device may include a processor, memory and instructions stored in memory that can be executed by the processor to control rendering of media. In such an example, control may include implementation of motion sensing circuitry and/or audio codec circuitry. As an example, control may include transmitting signals via one or more busses. For example, consider receiving information from motion sensing circuitry via a bus and transmitting information to audio codec circuitry via a bus. In such an example, a bus may be an I$^2$C bus or other type of bus.

Figure 14:
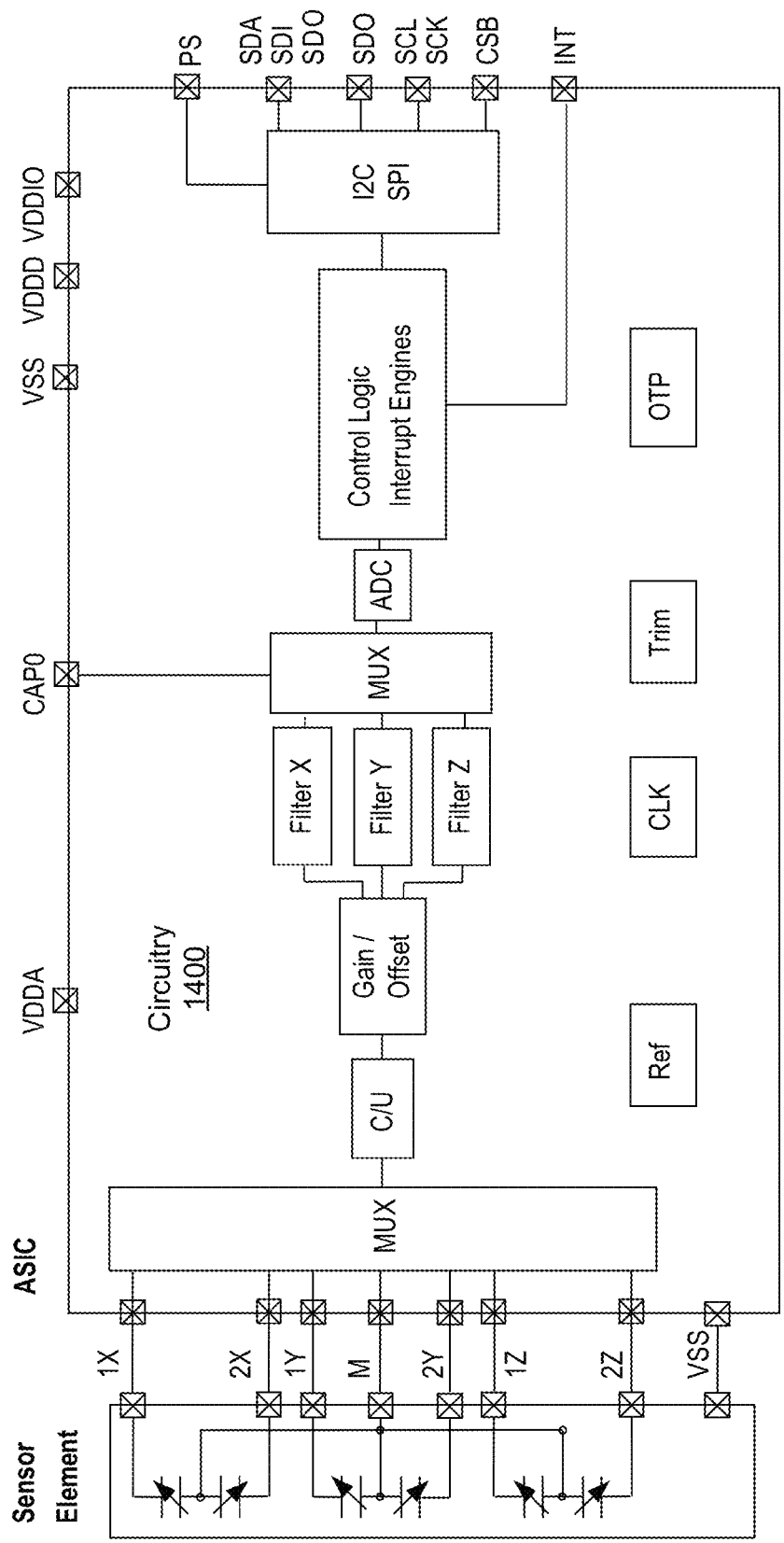
FIG. 14 illustrates an example of circuitry.

FIG. 14 shows an example of circuitry 1400 that includes motion sensing circuitry. In particular, a sensor element is shown that includes x, y and z sensing circuits, which may be accelerometer circuits. As an example, the x, y and z sensing circuits may correspond to x, y and z coordinates as illustrated in FIG. 13 (see, e.g., motion sensing circuitry 1350). As an example, a coordinate system may define yaw, roll and pitch (see, e.g., reference numerals 432, 434 and 436 of FIG. 4). As an example, yaw may be defined to be planar motion (e.g., rotation) and roll and pitch may be defined to be motion that tilts a plane (e.g., a geometrical plane), which may be a plane defined at least in part by an electronic device, for example, as carried by a turntable. As an example, an electronic device may be carried by a turntable where the electronic device may be carried at an angle (e.g., an offset angle) with respect to horizontal. Upon rotation about an axis, the electronic device may sweep a geometrical plane that includes a thickness along the axis. In such an example, circuitry may process information from motion sensing circuitry according to, for example, yaw, roll and pitch, to "standardize" the information in a manner that may compensate for an offset angle (e.g., which may be a slight angle of less than about 10 degrees).

As an example, an electronic device may be carried by a turntable where the turntable and the electronic device are rotatable, together, in a geometrical plane. In such an example, where the electronic device includes a display, information may be rendered to the display in a manner where at least a portion of the information appears stationary even where the electronic device is being rotated (e.g., clockwise and/or counter-clockwise). An offset angle, depending on degree, may impact an ability to make an image appear stationary on a display of an electronic device where the electronic device is being rotated. As such, as an example, a system may be configured to substantially position an electronic device in a geometrical plane that is a rotational plane of a turntable where rotation of the electronic device about a rotational axis sweeps the electronic device substantially within a dimension of the electronic device (e.g., thickness) along the rotational axis. For example, if the electronic device has a thickness along a rotational axis coordinate of X, the volume swept by rotation of the electronic device may have a thickness of approximately X; noting that the thickness of the volume swept by rotation may be expected to increase where an offset angle increases.

As shown in the example of FIG. 14, the circuitry 1400 may include an I$^2$C interface and/or an SPI interface (e.g., which may operate via receipt and/or transmission of information via one or more busses). As an example, the circuitry 1400 may include signal processing circuitry such as one or more amplifiers, multiplexers, filters, analog-to-digital converters (ADCs), control logic, interrupt engines, etc. As an example, motion sensing circuitry may include an ASIC that is operatively coupled to one or more sensor elements. In such an example, signals generated by a sensor element may be processed and, for example, transmitted as information via one or more interfaces, one or more busses, etc. As an example, a processor that can execute an application in an operating system environment may receive such information, process at least a portion of the information and transmit information to control media player circuitry, which may include audio codec circuitry and, for example, digital mixer circuitry.

As an example, rendering may include co-rendering. For example, a digital mixer may include features such as multiple inputs to receive information and to "mix" the information for purposes of outputting to an output device such as a speaker, wireless circuitry, etc. As an example, media player circuitry may co-render information from multiple files. As an example, media player circuitry may include or instruct a mixer to combine information from multiple files to generate output information that can be directed to an amplifier (e.g., via wire and/or wirelessly) operatively coupled to one or more speakers. As an example, co-rendering may be performed via multiple circuits. As an example, a media file may be subject to digital rights management (DRM) and be rendered via circuitry that can manage DRM and/or a media file may be free of DRM technology and be rendered via circuitry that may or may not include DRM circuitry. As an example, layering may include mixing media where the media may include DRM restrictions and/or no DRM restrictions. As an example, co-rendering may act to blend media from multiple files. As an example, volume may be independently set for individual files. As an example, processing may be performed in at least in part independently for individual files and/or processing may be performed for mixed information that includes information (e.g., optionally processed) from multiple files. Co-rendering can include rendering of information where the information includes information from multiple files. As an example, co-rendering can include rendering of information of a file where a portion of the information of the file has been processed to alter that portion of information and where another portion of information of the file may be combined (e.g., mixed) with that portion, which may optionally be itself altered. In such an example, the two portions may be streams. As an example, a stream may be considered to be information of a file where it includes information (e.g., digital information) that may be stored in one or more media (e.g., stored in memory). Thus, as an example, multiple streams may be considered to be information of multiple files. As an example, multiple streams may be considered to be data of multiple files (e.g., data of a first file and data of a second file, etc.).

As an example, a file may be a digital file such as a MIDI file (e.g., a digital data file). MIDI files may be formatted according to a file format that can provide for sequences to be saved, transported, opened, etc. As an example, a device may be configured to render information from a MIDI file, optionally as a layer. As an example, a device may be configured to generate a MIDI file (e.g., to store and use as a layer). As an example, a device may be configured to receive MIDI information via a wireless interface. For example, consider a MIDI controller (e.g., MIDI keyboard) that can transmit information to a device wirelessly where the device may be carried by a turntable (see, e.g., the system 500 of FIG. 5). In such an example, a turntablist may add "tracks", effects, samples, etc. via the MIDI controller and optionally morph/control rendering thereof via the turntable (e.g., via rotations, bumps, etc.). While MIDI is mentioned, a device may operate via one or more other technologies and be configured to transmit information wirelessly to a device carried by a turntable.

As an example, a method can include sensing acceleration, adjusting one or more parameters of audio circuitry and rendering audio data via the audio circuitry. For example, the acceleration may be acceleration associated with rotation that causes one or more directional acceleration sensing circuits of a rotated accelerometer to experience force. In such an example, a rotation direction (e.g., clockwise or counter-clockwise) may be determined and used to adjust a playback direction parameter (e.g., to render audio data in a forward direction or in a reverse direction).

As an example, a method can include sensing acceleration and adjusting one or more parameters of illumination circuitry. For example, the acceleration may be acceleration associated with rotation that causes one or more directional acceleration sensing circuits of a rotated accelerometer to experience force. In such an example, a rotation direction (e.g., clockwise or counter-clockwise) may be determined and used to adjust a flash parameter (e.g., that triggers a flash, sets intensity of a flash, synchronizes a flash with an audio signal, etc.).

As an example, a method can include triggering a flash responsive to rotation of a cellular phone disposed in a seat of a turntable. In such an example, the seat may be operatively coupled to one or more waveguides that can transmit electromagnetic energy generated by the flash. As an example, a waveguide may be an optical fiber, a layer of optically conductive material, etc.

As an example, a method can include sensing rotation of a display device seated in a turntable, altering rendering of audio data based at least in part thereon and triggering a flash circuit to illuminate at least a portion of the turntable. In such an example, the method may include maintaining a reference frame for information rendered to the display that is immune to rotation of the display device. As an example, the information rendered to the display may be associated with rendering of audio data, etc.

As an example, a method can include altering audio using sensed information associated with acceleration, direction, velocity, orientation for one or more durations of time. In such an example, the method may include recording altered settings and/or altered audio and, for example, setting one or more loops that may be implemented, for example, by actuating a graphical control such as a playback control (e.g., playback button). As an example, during looping, a method may include playing one or more new audio files, which may be controlled via turntable-based gesture input (acceleration, direction, velocity, orientation), for example, on top of the looping audio. Such an approach may be referred to as layering, for example, where separate audio may be layered to include a number of sounds playing over one another. As an example, on top of audio layers a new audio layer may be added that is actively affected by the rotation, direction, velocity, and orientation of an electronic device seated in a turntable.

As an example, a device may be configured to record a duration of sound produced through spinning of the device, then layering media on top of one another, with the top layer being actively changed by the motions of a turntable to which the device is fixed.

As an example, a system that includes a device seated in a turntable may play/activate a selected audio file by bumping or agitating the device as it lay in a recess of the turntable. For example, such effects may be generated in relation to slapping or shocking the turntable (e.g., optionally in addition to spinning).

As an example, a device may include one or more sound libraries and/or network access to one or more sound libraries. As an example, an application may include instructions and media, for example, one or more sound clips. As an example, an application may include a module for voice recording and optionally storage and playback of a voice recording.

As an example, a device may be configured with an application that provides an ability to change one or more graphics that may be rendered to a display of the device, optionally while the device is rendering media. As an example, a blue spiral may be rendered to a display where the spiral remains visually stable even as the device is rotated (e.g., as seated in a turntable). As an example, a graphic may be a pre-packaged graphic available with an application or a graphic accessible via a network (e.g., for download). As an example, where a device includes camera and/or video circuitry, media captured by such circuitry may be selectable, optionally via a media library and/or live.

As an example, a GUI may include one or more portions that disappear responsive to sensed motion. For example, a control GUI may be less aesthetically pleasing than a graphic that fits a style of music. Such an approach can provide a clean look (e.g., emulating a vinyl record) when a turntable is in motion. As an example, when spinning stops, a GUI may visually reappear (e.g., optionally after a brief delay) and a user may thereby re-engage with one or more of controls of the GUI. Once reengaged by motion, the GUI may disappear again.

As an example, a turntable may be configured for receipt of a device that includes one or more game applications.

Figure 15:
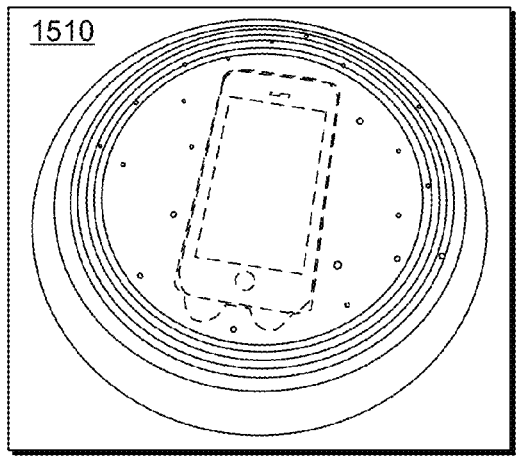
FIG. 15 illustrates examples of perspective views of turntables showing my design and an example of a plan view of a turntable showing my design.
Figure 15:
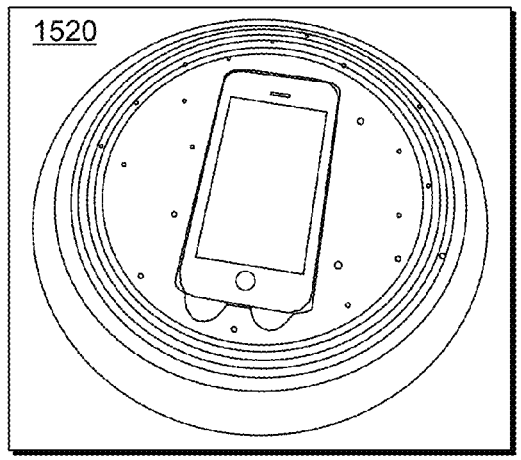
Figure 15:
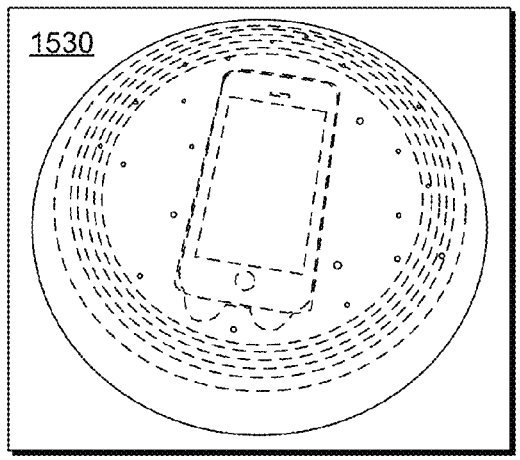
Figure 15:
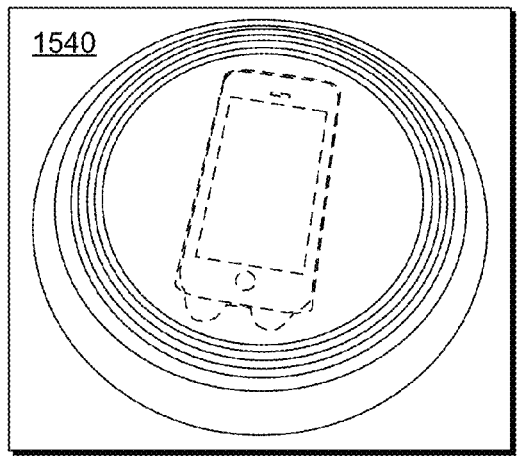
Figure 15:
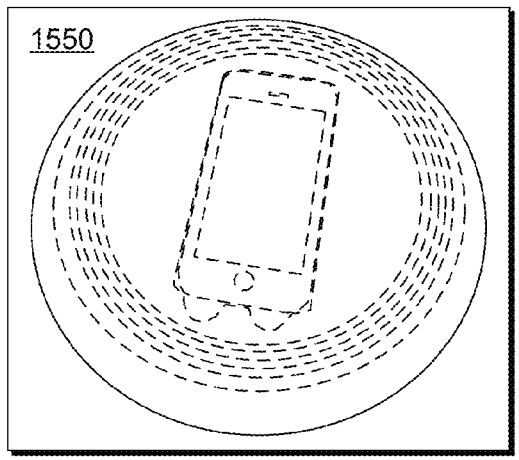
Figure 15:
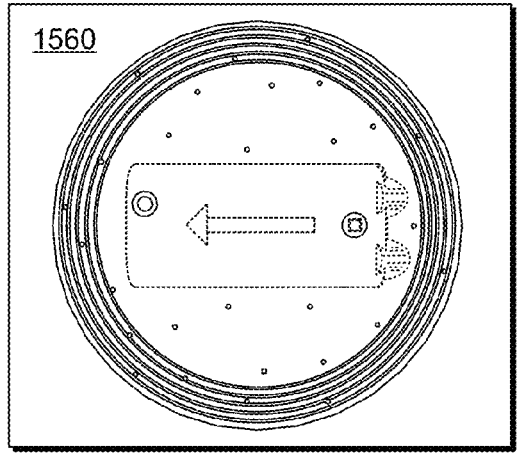

In FIG. 15, reference numeral 1510 shows a perspective view of a turntable our design where broken lines in the drawing are environmental structure or boundaries that form no part of a claimed design. The characteristic feature of the design resides in a turntable with illumination openings and concentric surface ridges. In the example identified by reference numeral 1510, light rays can be emitted from the illumination openings. Light rays may be shown as, for example, broken lines where the turntable may be an illuminating turntable. The design may vary with respect to time based at least in part on control of an illumination source. As an example, the broken lines illustrate a device that can include an illumination source. As an example, an illumination source may be a flash of a device such as a cellular phone, a tablet or other electronic device.

In FIG. 15, reference numeral 1520 shows a perspective view of a turntable our design where broken lines in the drawing are environmental structure or boundaries that form no part of a claimed design. The characteristic feature of the design resides in a turntable with an electronic device seated at least partially in a recess of the turntable.

In FIG. 15, reference numeral 1530 shows a perspective view of a turntable our design where broken lines in the drawing are environmental structure or boundaries that form no part of a claimed design. The characteristic feature of the design resides in a turntable with illumination openings. In the example identified by reference numeral 1530, light rays can be emitted from the illumination openings. Light rays may be shown as, for example, broken lines where the turntable may be an illuminating turntable. The design may vary with respect to time based at least in part on control of an illumination source. As an example, the broken lines illustrate a device that can be seated at least partially in a recess of the turntable where the device includes an illumination source. As an example, an illumination source may be a flash of a device such as a cellular phone, a tablet or other electronic device.

In FIG. 15, reference numeral 1540 shows a perspective view of a turntable our design where broken lines in the drawing are environmental structure or boundaries that form no part of a claimed design. The characteristic feature of the design resides in a turntable with concentric surface ridges. As an example, the broken lines illustrate a device that can be seated at least partially in a recess of the turntable.

In FIG. 15, reference numeral 1550 shows a perspective view of a turntable our design where broken lines in the drawing are environmental structure or boundaries that form no part of a claimed design. As an example, the broken lines illustrate a device that can be seated at least partially in a recess of the turntable. Such a device can include a display, for example, as shown in broken lines. In such an example, the display can be used to visually render icon images. For example, an icon image may be an image of a graphical user interface (GUI). As an example, the turntable identified by reference numeral 1550 may include an electronic device that includes graphics circuitry that can render images to a display panel of the electronic device where the images are one or more computer icon images of FIGS. 16, 17, 18, 19 and 20. The characteristic feature of a design can resides in a turntable with an electronic device with a display panel and one or more computer icon images such as, for example, one or more of the computer icon images of FIGS. 16, 17, 18, 19 and 20 (e.g., or FIG. 11 or FIG. 12).

In FIG. 15, reference numeral 1560 shows a plan view of a turntable our design where broken lines in the drawing are environmental structure or boundaries that form no part of a claimed design. The article of manufacture of FIG. 15 identified by reference numeral 1560 may be understood, for example, with respect to at least FIG. 1. The characteristic feature of the design resides in a turntable with concentric surface ridges and illumination openings. The broken lines illustrate a recess that can at least partially receive and seat an electronic device where the electronic device can include a flash unit that can emit electromagnetic energy at a position that corresponds to a port illustrated as being in the left side of the recess. The port may couple via one or more waveguides electromagnetic energy to at least some of the illumination openings. The broken lines at the right side of the recess illustrate supplemental recesses that can be aligned with one or more speakers of an electronic device that is at least partially received and seated in the recess.

Figure 16:
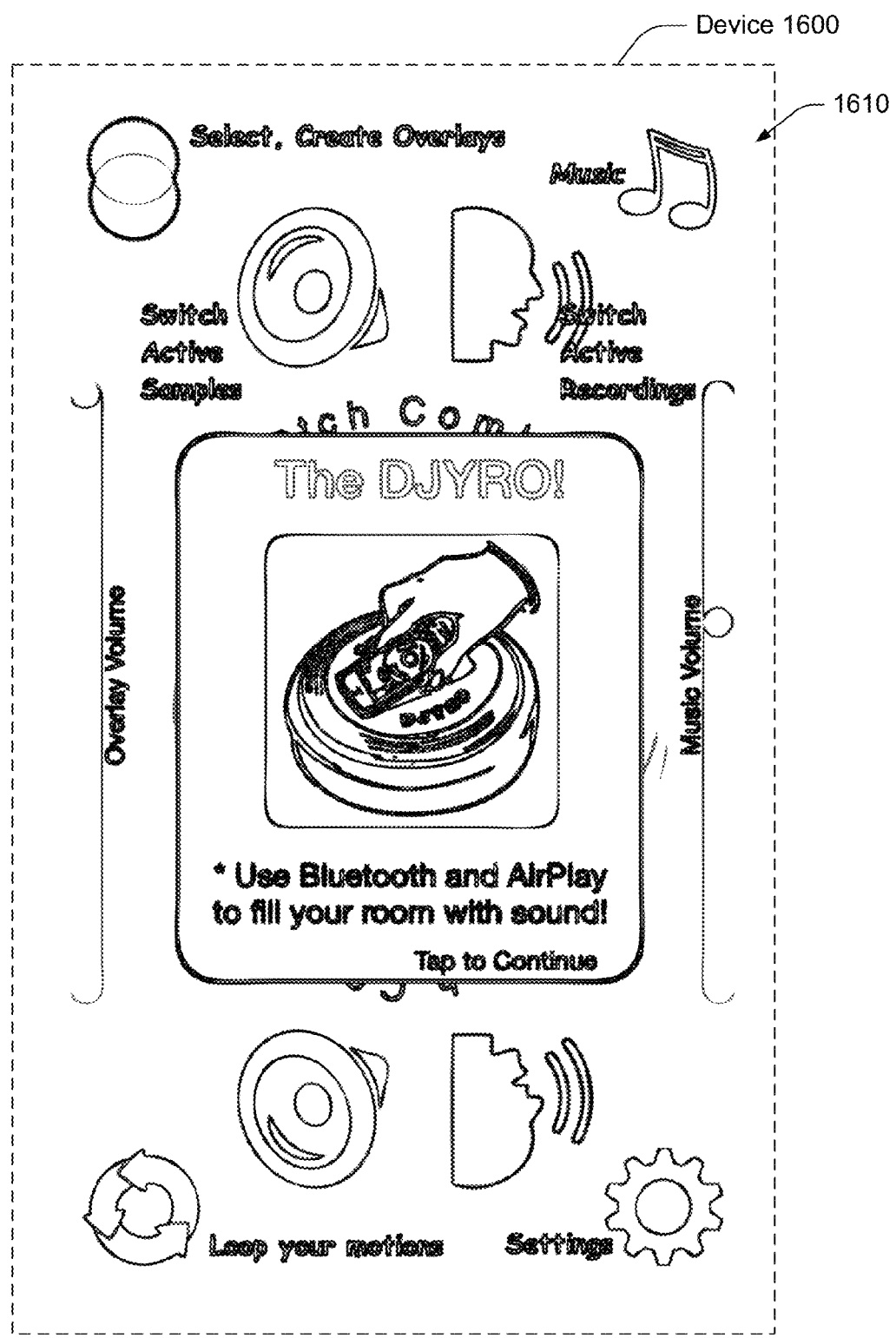
FIGS. 16-20 illustrate examples of a display panel with one or more computer icon images.

FIG. 16 shows a device 1600 that includes a display with a computer icon image 1610. Broken lines in the drawing are environmental structure or boundaries of the device 1600 that form no part of a claimed design.

The computer icon image of FIG. 16 includes a commencement graphic that illustrates a user positioning an electronic device such as the device 1600 itself into a turntable that includes a recess. The graphic can include instructions such as "use Bluetooth" or "use AirPlay", which are wireless technologies that can transmit signals to, for example, a receiver that can amplify the signals and direct amplified signals, optionally digitally processed, to one or more speakers.

In the example of FIG. 16, the computer icon image 1610 can include one or more slider graphical user controls. For example, consider a music volume control and an overlay volume control.

Figure 17:
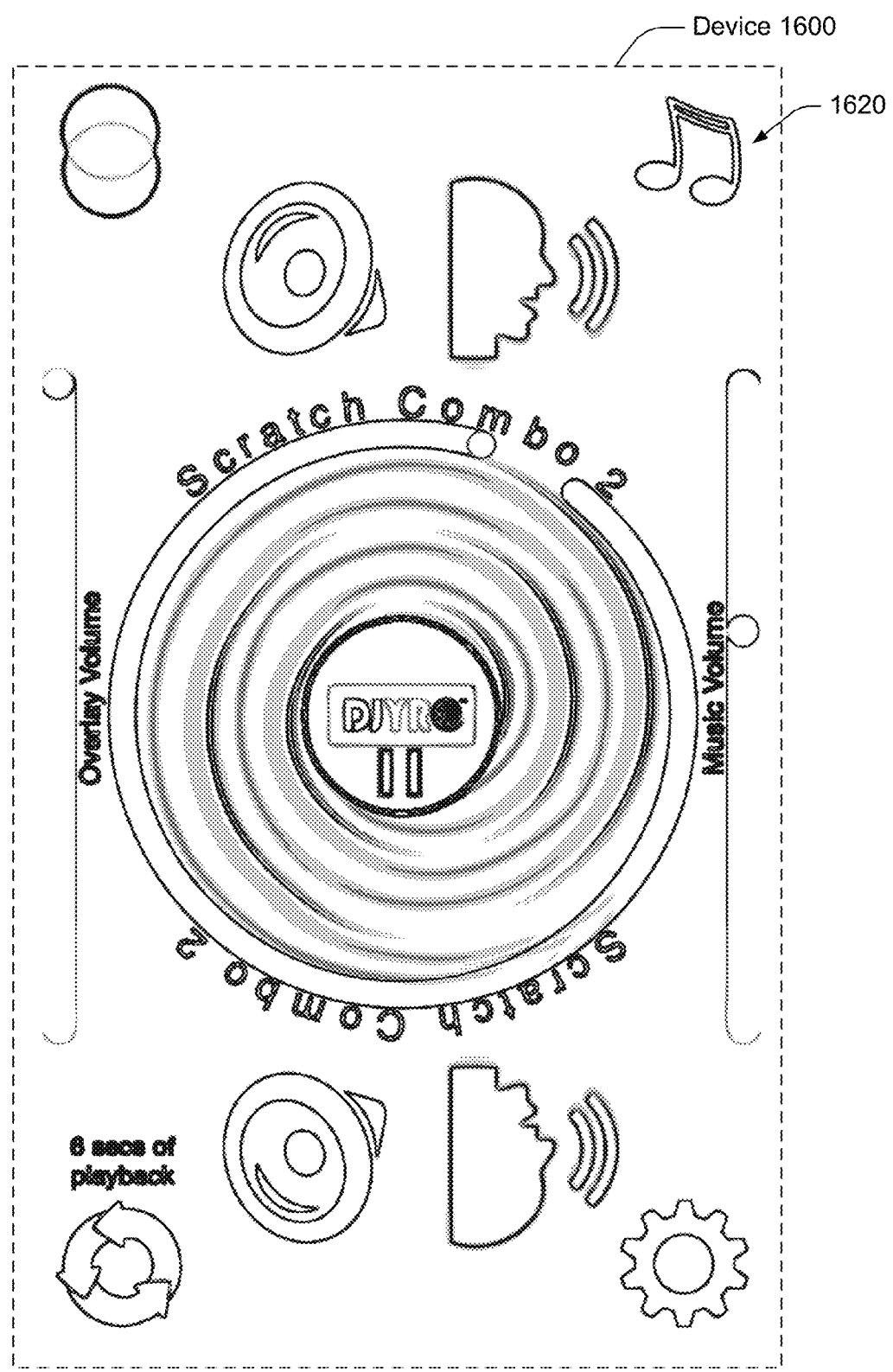

FIG. 17 shows a device 1600 that includes a display with a computer icon image 1620. Broken lines in the drawing are environmental structure or boundaries of the device 1600 that form no part of a claimed design.

Figure 18:
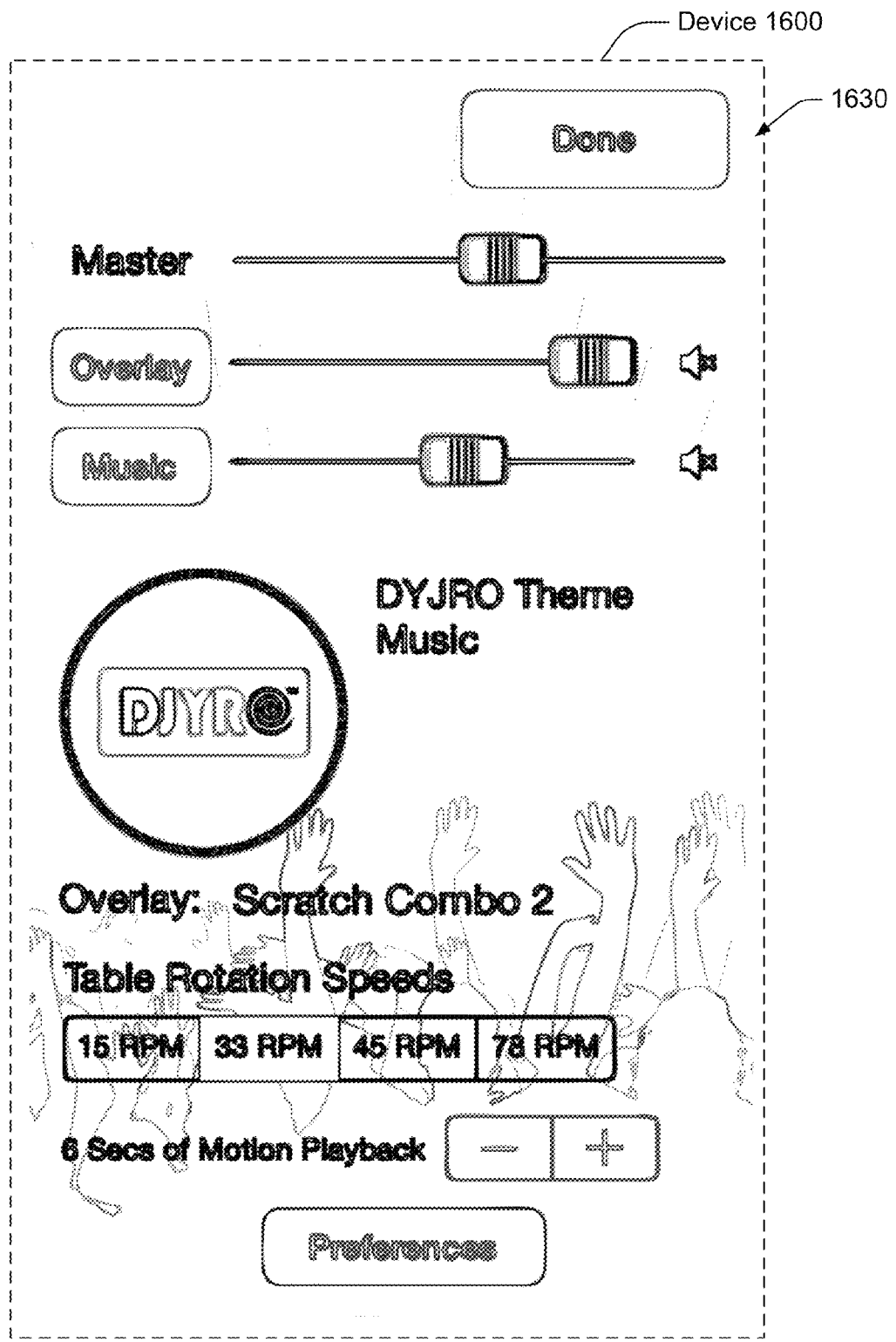

FIG. 18 shows a device 1600 that includes a display with a computer icon image 1630. Broken lines in the drawing are environmental structure or boundaries of the device 1600 that form no part of a claimed design.

FIG. 18 illustrates the computer icon image 1630 as including a done button, a master volume control slider, an overlay volume control slider and a music volume control slider. These may be features of a graphical user control that is rendered to a display by execution of processor-executable instructions stored in memory of a device (e.g., physical memory). The display of the device 1600 may be a touch-sensitive display that can respond to user touches. For example, a user may touch the slider control graphics to slide them to the right or to the left to adjust circuitry that controls signal amplitude (e.g., as to volume).

As an example, an electronic device seated with respect to a turntable can include a rotation speed that may be one of a standard rotation speed of existing technology. For example, consider vinyl record speeds of 33 RPM, 45 RPM and 78 RPM and optionally one or more other speeds (e.g., 15 RPM). Such speeds may correspond to spinning of a record player such as a record player to which a turntablist may be accustomed to using. For example, consider a turntablist that uses a record player with 45's and that is accustomed to clockwise and counter-clockwise rotations of the turntable of the record player to make certain sounds from a 45 RPM record. By selecting the 45 RPM speed as a table rotation speed as shown in FIG. 18, the turntable that carries the electronic device may "mimic" the behavior of the record player (e.g., with a 45 RPM record). In such a manner, a turntablist may more readily adapt to a turntable such as the system 500 of FIG. 5.

Figure 19:
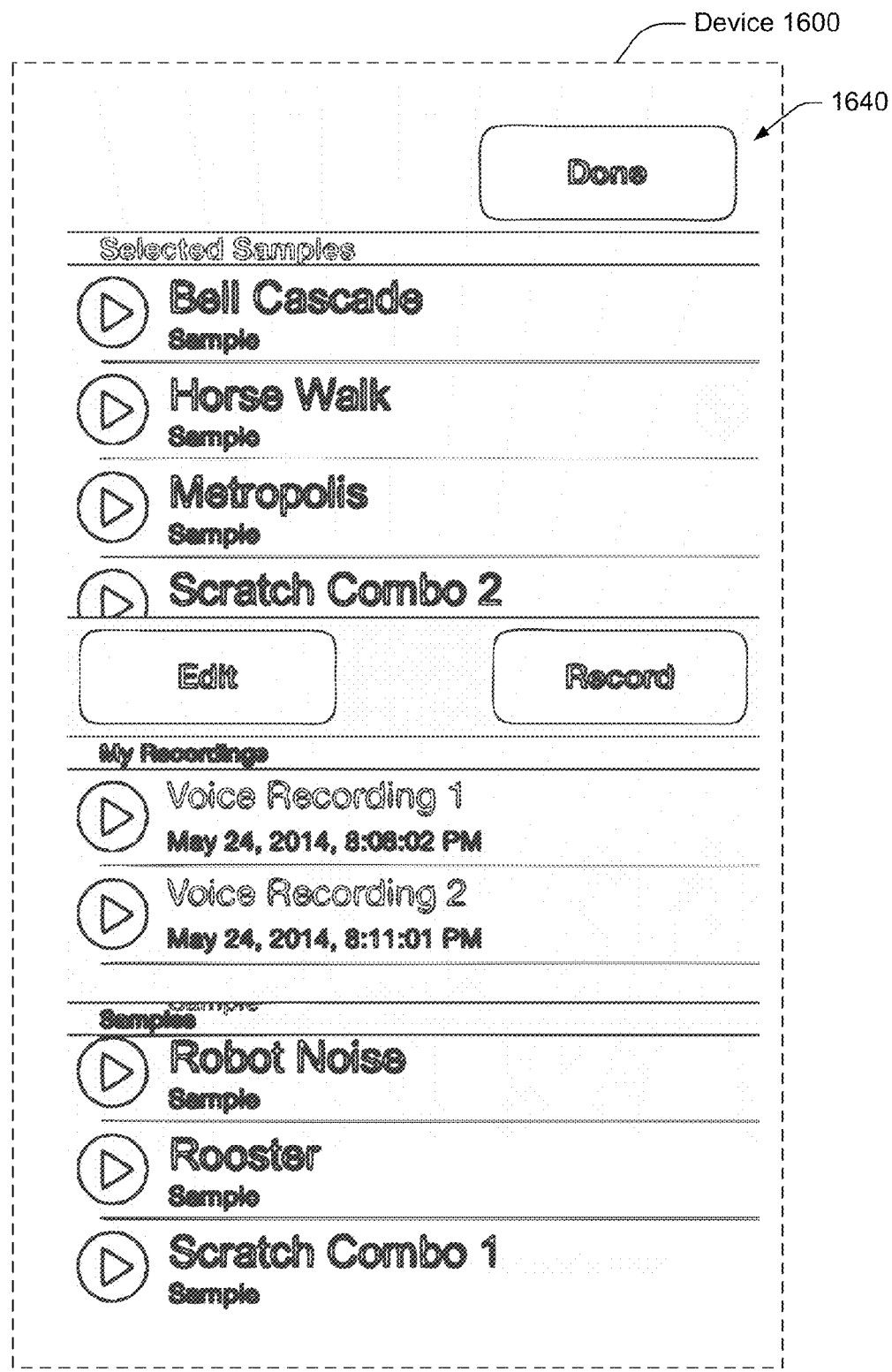

FIG. 19 shows a device 1600 that includes a display with a computer icon image 1640. Broken lines in the drawing are environmental structure or boundaries of the device 1600 that form no part of a claimed design.

As an example, an electronic device can include memory that stores one or more audio files. As an example, the computer icon image 1640 may provide for access to the one or more stored audio files, for example, as one or more files of one or more audio file libraries. For example, consider a "selected sample" library, a "my recordings" library and a "samples" library. As an example, a graphical user interface may allow for editing or recording via actuation of an edit control or a record control.

Figure 20:
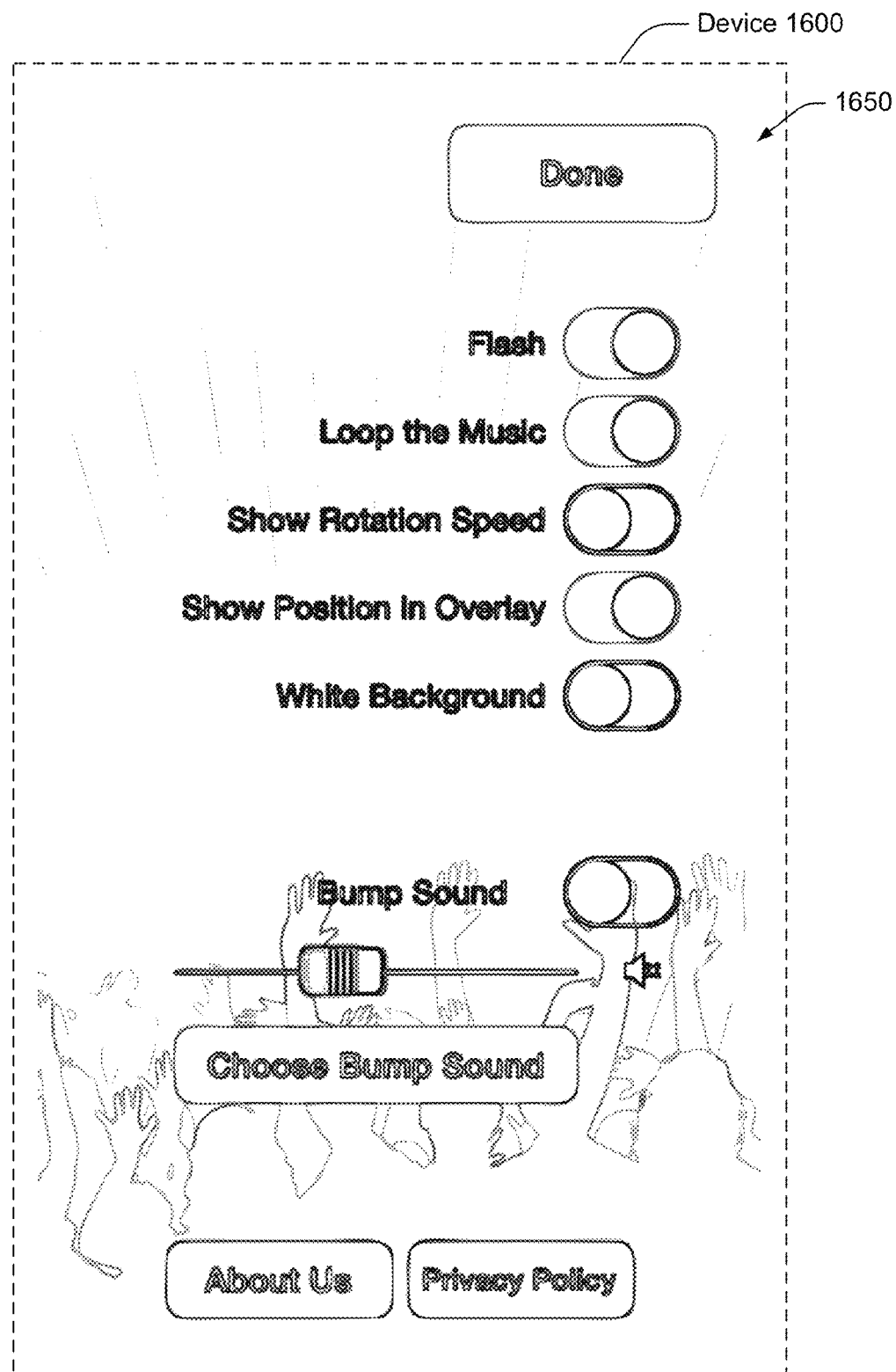

FIG. 20 shows a device 1600 that includes a display with a computer icon image 1650. Broken lines in the drawing are environmental structure or boundaries of the device 1600 that form no part of a claimed design.

In the example of FIG. 20, various features are shown such as, for example, a flash feature, a loop the music feature, a show rotation speed feature, a show position in overlay feature, a background color feature, a bump sound selection feature and a privacy policy feature. As an example, these features may control circuitry. For example, the flash feature may toggle circuitry operatively coupled to a flash unit (e.g., on/off). As an example, the bump feature may include a bump slider to control volume of a bump sound. For example, as mentioned, motion sensing circuitry of an electronic device carried by a turntable may respond to motion to generate a "bump" sound. A bump sound may be a sound that is not a "rotational" sound (e.g., a sound that is generated responsive to rotation of a turntable). Thus, a user may rotate a turntable to generate one sound and may bump the turntable (e.g., non-rotational movement about an axis of rotation) to generate another sound (e.g., a bump sound).

As an example, an electronic device carried by a turntable can include circuitry for playing music, circuitry for playing one or more overlays over the music where at least one of the overlays is controlled via rotation of the turntable and, for example, circuitry for playing one or more bump sounds at least over the music or at least over at least one overlay where the one or more bump sounds are controlled via tilting, bumping, jarring, etc. the turntable such that the rotational axis of the turntable may tilt or such that motion sensing circuitry senses such input as being at least in part non-rotational input.

As an example, an assembly can include a base; and a turntable rotatably coupled to the base where the turntable includes an optical port, a mount that positions an electronic device with respect to the optical port and at least one waveguide operatively coupled to the optical port. In such an example, the mount may be or include a rectangular recess where, for example, the optical port is disposed in a floor of the rectangular recess.

As an example, the at least one waveguide can be or include an optical fiber. As an example, a waveguide can include a polymer or polymers. As an example consider poly(methyl 2-methylpropenoate) and/or polycarbonate. As an example, a thermoplastic polymer may be used to form a waveguide.

As an example, an assembly can include a turntable that includes at least one opening configured for emission of light carried by at least one of the at least one waveguide.

As an example, a device can include a processor; memory operatively coupled to the processor; a display operatively coupled to the processor; media player circuitry operatively coupled to the processor; motion sensing circuitry operatively coupled to the processor; and one or more modules stored in the memory where the one or more modules include processor-executable instructions to instruct the media player circuitry to co-render data of a first media file and data of a second media file where the data of the second media file is rendered based at least in part on output of the motion sensing circuitry. As an example, such a device may include a power source such as, for example, a battery or batteries. As an example, such a device may be suitable for mounting by a mount of a turntable, which may be or include, for example, a recess (e.g., as a mount).

As an example, a device can include a flash unit or flash units (e.g., flash circuitry). As an example, one or more modules may be stored in memory and include processor-executable instructions to instruct a flash unit to flash based at least in part on output of motion sensing circuitry.

As an example, a device may co-render a first media file that may be, for example, a song file and a second media file that may be, for example, a sample file. As an example, a device may be a turntablist device that can co-render media files as layers. For example, a song file may be a layer over which a sample file is rendered as an overlay layer. As an example, a sample file may be recorded via a process known as sampling.

As an example, a device can include audio recording circuitry. As an example, a device can include a touch sensitive display.

As an example, a device can include one or more modules stored in memory of the device where the one or more modules include processor-executable instructions to instruct a display of the device (e.g., via display circuitry) to display information (e.g., to visually render information) based at least in part on output of the motion sensing circuitry.

As an example, a device can include wireless communication circuitry that can communicate audio information and optionally other information. For example, the device may be a transmitter that transmits audio information to a receiver where the receiver may include one or more speakers operatively coupled thereto for generating acoustic waves based at least in part on at least a portion of the audio information.

As an example, a device can include a central axis and motion sensing circuitry of the device can output information responsive to clockwise and counter-clockwise rotation of the device about its central axis. In such an example, the device may be a smart phone (e.g., an Android phone, an iOS phone, etc. that can execute an operating system for running one or more applications).

As an example, a device can include a processor; memory operatively coupled to the processor; a display operatively coupled to the processor; media player circuitry operatively coupled to the processor; motion sensing circuitry operatively coupled to the processor; and one or more modules stored in the memory where the one or more modules include processor-executable instructions to instruct the media player circuitry to co-render data of a first media file and data of a second media file where the data of the second media file is rendered forward or backward responsive to output of the motion sensing circuitry that indicates that the device is rotated clockwise or counter-clockwise. In such an example, the device may be a smart phone (e.g., an Android phone, an iOS phone, etc. that can execute an operating system for running one or more applications).

As an example, one or more computer-readable media (that are not carrier waves) can include processor-executable instructions to instruct a smart phone to: co-render data of a first audio file and data of a second audio file where the data of the first media file is rendered at a predetermined rate and where the data of the second media file is rendered at a rate that is based at least in part on rotation of the smart phone within a geometrical plane. In such an example, processor-executable instructions can be included to instruct the smart phone to co-render data of a third audio file based at least in part on motion of the smart phone other than rotation of the smart phone within the geometrical plane.

Although various examples of methods, devices, systems, designs, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, designs, etc.

What is claimed is:

1. A device comprising:
    a processor;
    memory operatively coupled to the processor;
    a display operatively coupled to the processor;
    media player circuitry operatively coupled to the processor;
    motion sensing circuitry operatively coupled to the processor; and
    one or more modules stored in the memory wherein the one or more modules comprise processor-executable instructions to instruct the media player circuitry to render media wherein the media is rendered based at least in part on output of the motion sensing circuitry responsive to rotation of the device about an axis substantially normal to the display, and wherein the one or more modules comprise processor-executable instructions to instruct the device to render a graphical user interface to the display in a stationary reference frame with respect to a rotational reference frame associated with rotation of the device about the axis substantially normal to the display wherein the graphical user interface comprises, in the stationary reference frame, fixed information associated with the media and information associated with the media that changes responsive to rotation of the device about the axis substantially normal to the display.

2. The device of claim 1 comprising a flash unit.

3. The device of claim 2 wherein the one or more modules stored in the memory comprise processor-executable instructions to instruct the flash unit to flash based at least in part on output of the motion sensing circuitry.

4. The device of claim 1 comprising audio recording circuitry.

5. The device of claim 1 comprising a touch sensitive display.

6. The device of claim 1 comprising wireless communication circuitry that communicates audio information.

7. The device of claim 1 comprising a smart phone.

8. One or more computer-readable media comprising processor-executable instructions to instruct a smart phone to:
    render media wherein the media is rendered based at least in part on output of motion sensing circuitry of the smart phone responsive to rotation of the smart phone about an axis substantially normal to a display of the smart phone; and
    render a graphical user interface to the display in a stationary reference frame with respect to a rotational reference frame associated with rotation of the smart phone about the axis substantially normal to the display wherein the graphical user interface comprises, in the stationary reference frame, fixed information associated with the media and information associated with the media that changes responsive to rotation of the smart phone about the axis substantially normal to the display.

9. The one or more computer-readable media of claim 8 wherein the rotation of the smart phone comprises clockwise or counter-clockwise rotation about the axis substantially normal to the display.

10. The device of claim 1 wherein the rotation of the device comprises clockwise or counter-clockwise rotation about the axis substantially normal to the display.

* * * * *